United States Patent
Dickerson et al.

(10) Patent No.: US 9,283,723 B2
(45) Date of Patent: Mar. 15, 2016

(54) RELEASE MECHANISM FOR A TIRE BUILDING DRUM

(71) Applicant: The Goodyear Tire & Rubber Company, Akron, OH (US)

(72) Inventors: Philip Edward Whitfield Dickerson, Akron, OH (US); Joshua Aaron Phillipson, Brecksville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 145 days.

(21) Appl. No.: 14/262,874

(22) Filed: Apr. 28, 2014

(65) Prior Publication Data

US 2015/0306832 A1    Oct. 29, 2015

(51) Int. Cl.
| | |
|---|---|
| *B29D 30/10* | (2006.01) |
| *B29D 30/26* | (2006.01) |
| *B29D 30/24* | (2006.01) |
| *B29K 105/24* | (2006.01) |

(52) U.S. Cl.
CPC .............. *B29D 30/26* (2013.01); *B29D 30/245* (2013.01); *B29D 30/10* (2013.01); *B29D 2030/2635* (2013.01); *B29K 2105/246* (2013.01)

(58) Field of Classification Search
CPC ........ B29D 30/12; B29D 30/26; B29D 30/36; B29D 2030/265; B29D 30/10
See application file for complete search history.

(56) References Cited

U.S. PATENT DOCUMENTS

| | | | |
|---|---|---|---|
| 3,815,916 A * | 6/1974 | Meszaros | F24B 6/06 273/DIG. 4 |
| 3,932,255 A | 1/1976 | Saracsan | |
| 4,798,647 A | 1/1989 | Haas | |
| 4,929,298 A | 5/1990 | Van Der Poel et al. | |
| 5,116,449 A | 5/1992 | Fabris et al. | |
| 5,246,515 A * | 9/1993 | Roedseth | B29D 30/32 156/131 |
| 5,273,612 A | 12/1993 | Suetomi et al. | |
| 6,129,812 A | 10/2000 | Sanders et al. | |
| 6,533,009 B2 * | 3/2003 | Aoki | B60C 19/002 152/339.1 |
| 6,880,603 B2 | 4/2005 | Akiyama | |
| 2006/0032576 A1 | 2/2006 | Girard et al. | |
| 2006/0137806 A1 | 6/2006 | Roedseth et al. | |
| 2013/0075041 A1 * | 3/2013 | Marechal | B29D 30/245 156/415 |

FOREIGN PATENT DOCUMENTS

| | | | | |
|---|---|---|---|---|
| JP | 2002-36813 | * | 2/2002 | ................. B60C 5/14 |
| JP | 2003-334868 | * | 11/2003 | ............. B29C 73/22 |
| WO | 2009128046 A1 | | 10/2009 | |

OTHER PUBLICATIONS

Euroean Search Report dated Sep. 8, 2015 for Application Serial No. 15165274.

* cited by examiner

*Primary Examiner* — Martin Rogers
(74) *Attorney, Agent, or Firm* — Robert N. Lipcsik

(57) ABSTRACT

A release mechanism for a rotatable tire building drum includes a continuous hoop of a non-stick and elastic polymer, the hoop further including a plurality of flaps each attached to the hoop at one end and unattached to the hoop at an opposite end.

4 Claims, 21 Drawing Sheets

RELEASE MECHANISM FOR A TIRE BUILDING DRUM

TECHNICAL FIELD

The present invention relates to a tire building drum for use in applying the belt reinforcing structure and tread onto an unvulcanized tire carcass.

BACKGROUND OF THE INVENTION

Tire building drums for applying a tread and belt package onto a green tire carcass are known. The tire building process generally has a stage one assembly of a tire carcass made of air impervious inner layer, a pair of beads, an apex, and a reinforcing ply extending between, and wrapping around, the beads to form ply turnups. This unvulcanized structure may also have sidewall rubber and outer rubber components, such as gum strips, chafers, or chippers added to the cylindrically shaped green tire carcass.

In a second stage, the green or uncured cylindrical carcass may be taken to a separate tire building drum wherein the beads are locked onto the drum, moved axially to a proper bead width spacing, and the carcass is toroidaly shaped by expanding the carcass using an inflatable bladder which allows the carcass to assume a shape more closely approximating a finished tire. At this point, belt or breaker reinforcements, such as steel cord reinforcement belts, may be applied onto the carcass. Typically, adjacent belt layers have cords oppositely oriented. Once the belt structure is applied, a layer of tread rubber may be added to complete the assembly.

These building drums may be capable of moving the center section radially outward while moving the beads axially inward. A green tire may also be built with a single drum assembly thereby allowing the ply turnup to be made as the tire ply is held vertically in the bead regions. Another second stage tire building drum may allow a relatively small tire carcass having a large diameter to be made. A machine may be specifically adapted to construct motorcycle tires of a diameter of 16.0 inches, 16.5 inches, and 17.0 inches of different axial bead widths.

SUMMARY OF THE INVENTION

A release mechanism for a rotatable tire building drum in accordance with the present invention includes a continuous hoop of a non-stick and elastic polymer, the hoop further including a plurality of flaps each attached to the hoop at one end and unattached to the hoop at an opposite end.

According to another aspect of the release mechanism, the release mechanism defines a peeling action during removal of a green tire from the rotatable tire building drum through the flaps attached to the hoop.

According to still another aspect of the release mechanism, the peeling action mitigates high shear forces that inhibit collapse of the tire building drum and removal of the green tire from the tire building drum.

According to yet another aspect of the release mechanism, the flaps extend both radially and circumferentially to define a vaned circle.

A rotatable tire building drum in accordance with the present invention includes a pair of axially and radially moveable bead locks and a radially expandable center building deck assembly that, when expanded, forms a 360° solid deck surface and a continuous hoop of a non-stick and elastic polymer, the hoop further including a plurality of flaps each attached to the hoop at one end and unattached to the hoop at an opposite end.

According to another aspect of the rotatable tire building drum, deck plates are formed as arcuate segments having a transverse cross sectional profile with a convex shape approximating an inside curvature of a motorcycle tire.

According to still another aspect of the rotatable tire building drum, each deck plate is attached to a deck linkage assembly.

According to yet another aspect of the rotatable tire building drum, attachment of each deck plate to a deck linkage assembly is defined by a quick release mechanism.

According to still another aspect of the rotatable tire building drum, the quick release mechanism is a quarter turn fastener.

According to yet another aspect of the rotatable tire building drum, two sets of deck plates are sized for a specific tire size.

According to still another aspect of the rotatable tire building drum, the deck plates are arranged in sets of two, each set of two deck plates being designed for building a motorcycle tire.

According to yet another aspect of the rotatable tire building drum, each deck plate is quickly detachable from the deck linkage assembly and replaced by a different sized deck plate for building tires of different sizes.

According to still another aspect of the rotatable tire building drum, a pneumatic pressurized air supply connects to the tire building drum, the air supply being operated by valves to move the bead locks radially outward to lock a pair of beads of a motorcycle unvulcanized tire carcass.

According to yet another aspect of the rotatable tire building drum, the bead locks are expandable to accommodate motorcycle bead diameters of 16.0 inches, 16.5 inches, and 17.0 inches.

According to still another aspect of the rotatable tire building drum, two sets of deck plates, a first set of six even deck plates and a second set of six odd deck plates arranged circumferentially to form a solid deck when radially expanded.

A rotatable tire building drum machine includes a shaft housing, a pair of axially moveable and radially expandable bead locks for holding and securing a pair of beads of a green or unvulcanized motorcycle tire supported on the shaft housing, a center radially expandable and retractable building deck assembly positioned axially between the bead locks and supported on the shaft housing, the building deck assembly having two sets of deck plates, the deck plates having been sized to abut at a fully expanded diameter to form a solid 360° building surface to support a tire carcass at a specified diameter wherein the two sets of deck plates are divided into a first set of even deck plates and a second set of odd deck plates, arranged in a sequence of at least 6 or more circumferentially adjacent abutting deck plates 1, 2, 3, 4, 5, 6 in an expanded state and in a retracted state the first set of even deck plates move radially inward of the second set resulting in a contracted position radially inward of the second set, the first set underlying the second set, a main center shaft connected to the bead locks having two opposing ends a first left end having a left screw pitch and a second right end having a right screw pitch, rotation of the main center shaft moves the bead locks axially, two pairs of diametrically opposed deck shafts internally mounted in the shaft housing, including a first pair of drive shafts having two first shafts aligned 180° apart for moving the even deck plates, a second pair of drive shafts having two second shafts aligned 180° apart each second shaft being between two first shafts, the second shafts for moving the odd deck plates, the shaft housing being cantilevered at one end mounted to a motor housing and the motor housing including three independent motors, a first motor for rotating the main center shaft, a second motor for rotating the first deck shaft, and a third motor for driving the second drive shaft, and a continuous hoop of a non-stick and elastic polymer, the hoop further including a plurality of flaps each attached to the hoop at one end and unattached to the hoop at an opposite end.

According to another aspect of the machine, each deck plate is formed as a arcuate segment having a transverse cross sectional profile having a convex shape approximating the inside curvature of a motorcycle tire.

According to still another aspect of the machine, each deck plate is attached to a deck linkage assembly.

According to yet another aspect of the machine, attachment of each deck plate to the deck linkage assembly is a quick release mechanism.

According to still another aspect of the machine, the quick release mechanism is a quarter turn fastener.

DEFINITIONS

As used herein and in the claims:

"Apex" means an elastomeric filler located radially above the bead and interposed between the plies and the ply turn-up.

"Axial" or "axially" means the lines or directions that are parallel or aligned with the longitudinal axis of rotation of the tire building drum.

"Bead" means that part of the tire comprising an annular tensile member commonly referred to as a "bead core" wrapped by ply cords and shaped, with or without other reinforcement elements such as flippers, chippers, apexes, toe guards and chafers, to fit the design rim.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Carcass" means an unvulcanized laminate of tire ply material and other tire components cut to length suitable for splicing, or already spliced, into a cylindrical or toroidal shape. Additional components may be added to the carcass prior to its being vulcanized to create the molded tire.

"Casing" means the tire carcass and associated tire components excluding the tread.

"Chafer" refers to a narrow strip of material placed around the outside of the bead to protect cord plies from the rim, distribute flexing above the rim, and to seal the tire.

"Circumferential" means lines or directions extending along the perimeter of the surface of the annular tread perpendicular to the axial direction.

"Cord" means one of the reinforcement strands of which the plies in the tire are comprised.

"Equatorial Plane (EP)" means the plane perpendicular to the tire's axis of rotation and passing through the center of its tread.

"Innerliner" means the layer or layers of elastomer or other material that form the inside surface of a tubeless tire and that contain the inflating fluid within the tire.

"Insert" means an elastomeric member used as a stiffening member usually located in the sidewall region of the tire.

"Ply" means a continuous layer of rubber-coated parallel cords.

"Radial" and "radially" mean directions radially toward or away from the axis of rotation of the tire building drum.

"Radial Ply Tire" means a belted or circumferentially restricted pneumatic tire in which at least one layer of ply has the ply cords extend from bead to bead at cord angles between 65° and 90° with respect to the equatorial plane of the tire.

"Shoulder" means the upper portion of sidewall just below the tread edge.

"Sidewall" means that portion of a tire between the tread and the bead.

"Tread" means a rubber component which when bonded to a tire carcass includes that portion of the tire that come into contact with the road when the tire is normally inflated and under normal load.

"Tread Width" means the arc length of the tread surface in the axial direction, that is, in a plane parallel to the axis of rotation of the tire.

BRIEF DESCRIPTION OF THE DRAWINGS

The present invention will be described by way of example and with reference to the accompanying drawings, in which.

DETAILED DESCRIPTION OF EXAMPLES OF THE PRESENT INVENTION

Figure 15:
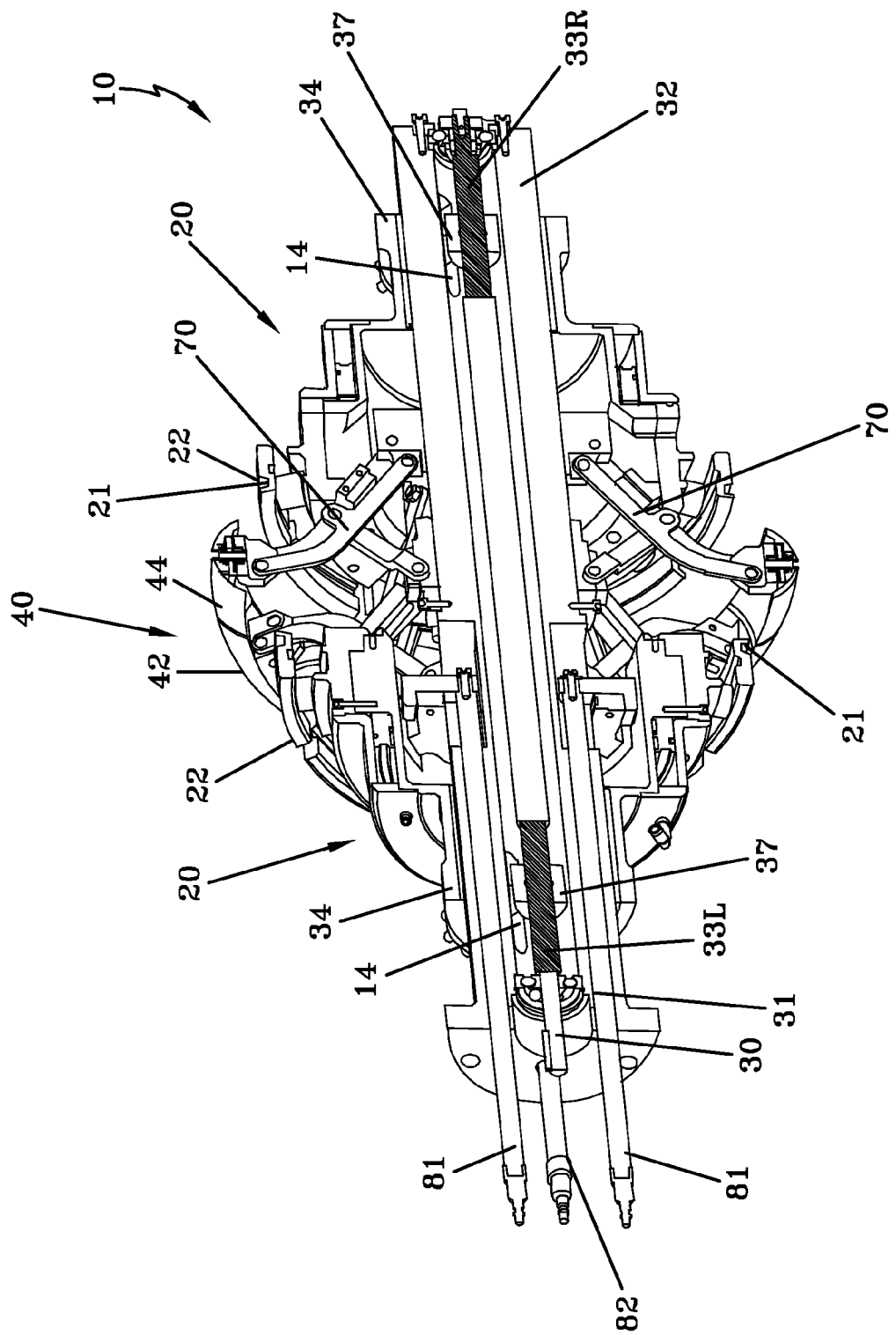
FIG. 15 is a cutaway perspective view of the tire building drum of FIG. 14.
Figure 16:
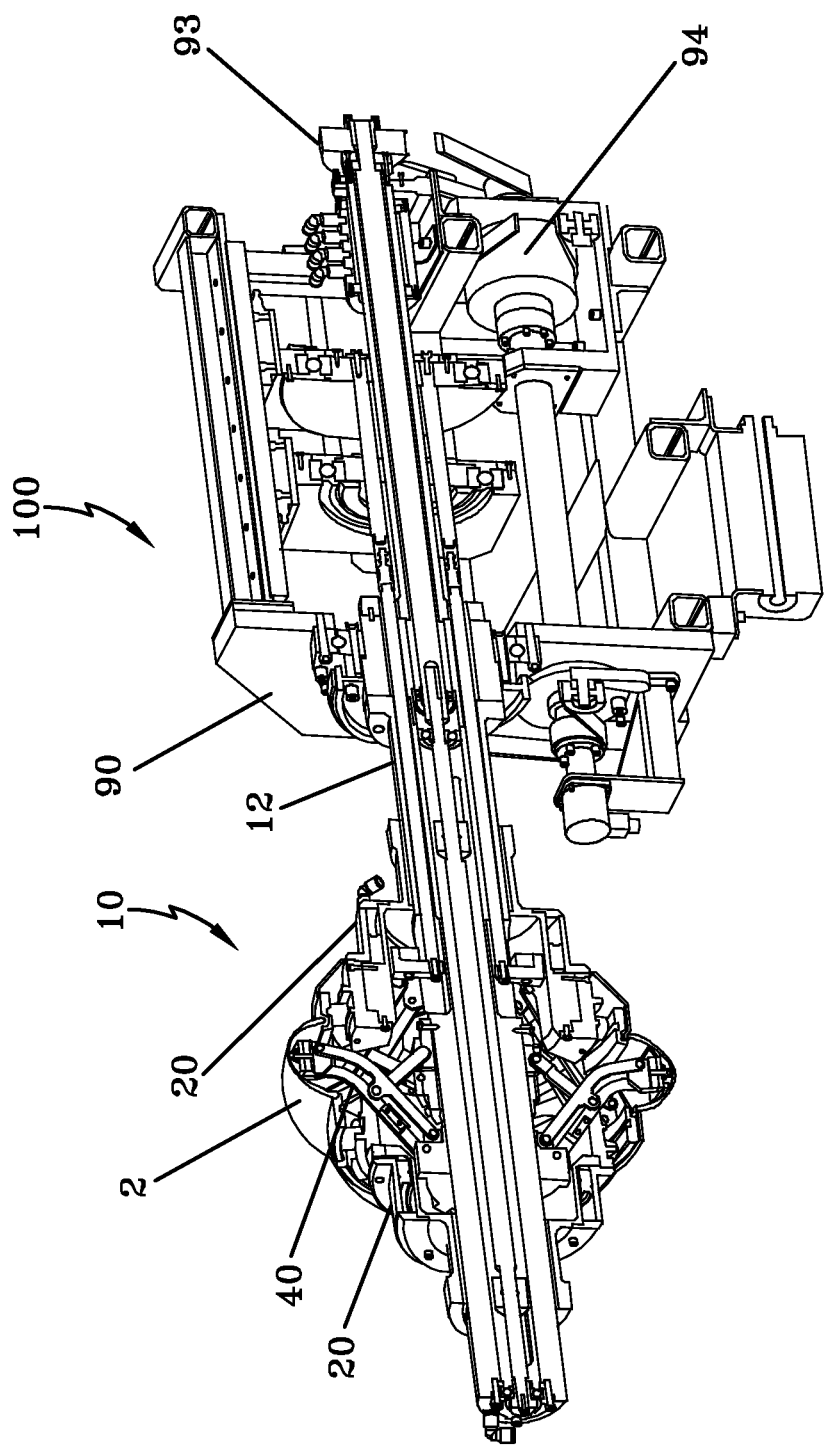
FIG. 16 is a cross-sectional view of the tire building drum and housing of FIG. 14.
Figure 17:
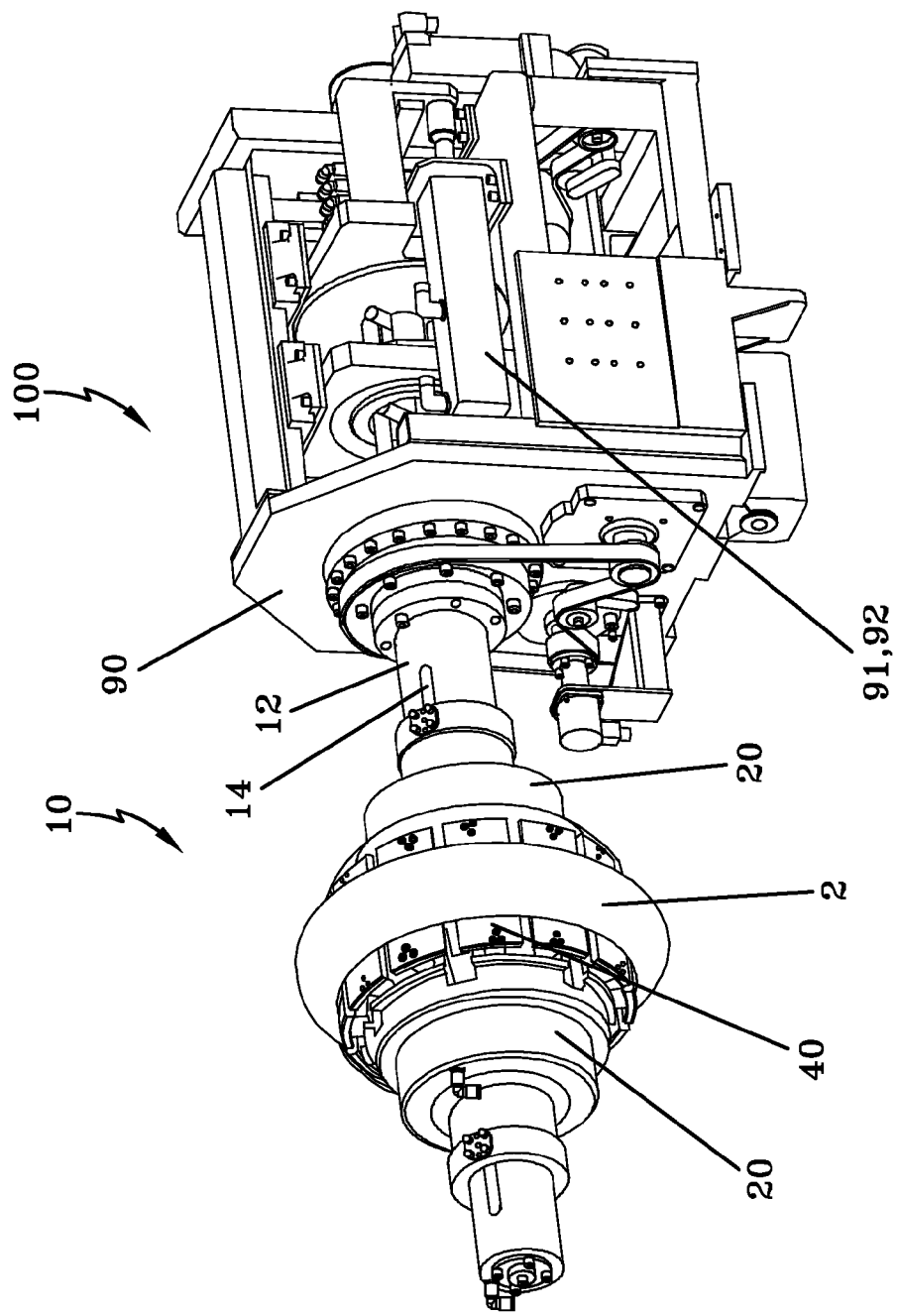
FIG. 17 is a perspective view of the overall machine showing the tire building drum assembled to the machine housing showing an exemplary carcass on the drum.

With reference to FIGS. 1 through 17, various views of a tire building drum for use with the present invention are illustrated. In each of the FIGS. 1 through 15, the relative position of a tire building drum 10 in relation to a tire carcass 2 is described, but, for clarity, the tire carcass 2 may not be shown. In FIGS. 16 and 17, the tire carcass 2 is shown on the tire building drum 10.

Figure 1:
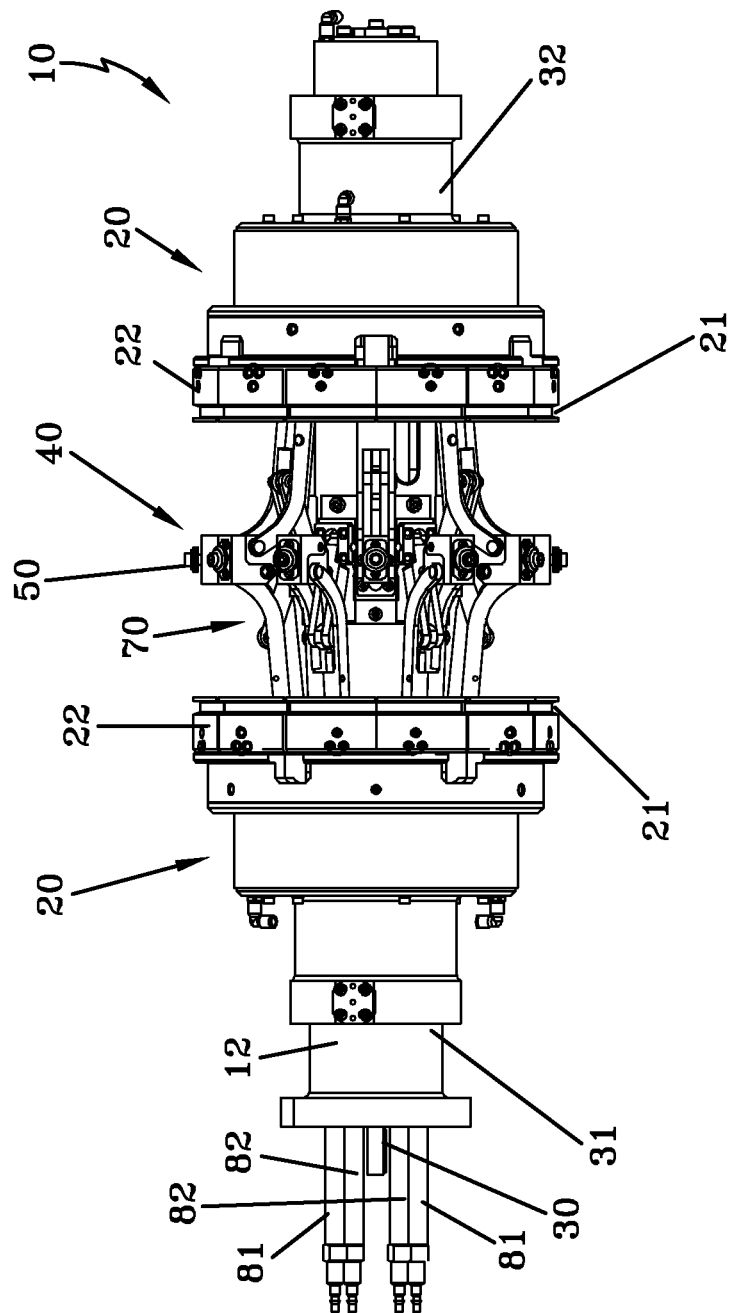
FIG. 1 is a plan or side view of the tire building drum for use with the present invention with the bead lock shown in the start position with the bead locks retracted and axially spaced wider than the finished bead width of a tire.

With reference to FIG. 1, the tire building drum 10 may be fully retracted with a pair of opposing bead locks 20 spaced at an axial width, one bead lock 20 located on each side of a center deck assembly 40. FIG. 1 shows the building drum 10 in a normally oriented position prior to the start of a stage two tire building process. In this position, the bead locks 20 may have a plurality of arcuate segments 22 in a fully retracted position for defining a small outer diameter. This small outer diameter may allow a cylindrical tire carcass 2 (shown toroidally shaped in FIGS. 16 and 17) to be slipped over a cantilevered end 32 of the tire building drum 10 and positioned over a pair of grooves 21 within the bead locks 20. When the tire carcass 2 slides over the building drum 10 and the bead locks 20 are in a fully retracted position, the fully retracted center deck building assembly 40 may provide easy movement of the tire carcass 2 over the tire building drum 10. For illustration purposes only, the center deck assembly 40 is shown with the deck plates 42, 44 removed. These deck plates 42, 44 are illustrated in FIGS. 9-14 and are described below. The center deck linkage mechanism 70 is shown with fasteners 50. These fasteners 50 may provide a quick release mechanism for attaching the deck plates 42, 44, also described below.

Figure 2:
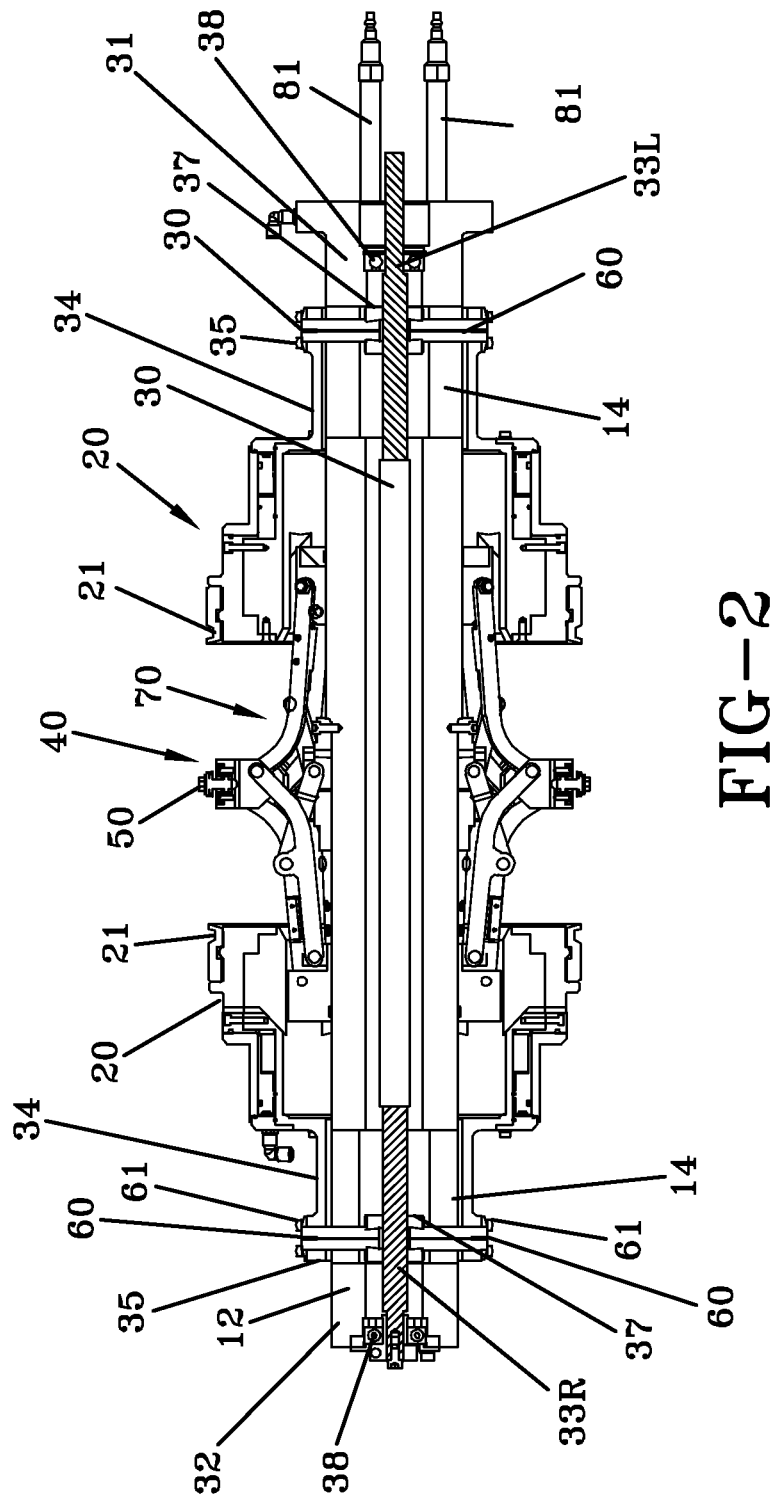
FIG. 2 is a cross-sectional view of the tire building drum of FIG. 1 showing the start position.

With reference to FIG. 2, a cross sectional view of the tire building drum 10 shows that the tire building drum 10 has a shaft housing 12 onto which the bead locks 20 may be fully supported. These bead locks 20 may be attached to a main center shaft 30 that drives the bead locks 20 axially inward or axially outward, depending upon the direction of rotation of the shaft 30. The left side or end 31 of the shaft housing 12 may expose the main drive shaft 30 and may be attached to the shaft housing, as shown in FIGS. 16 and 17. The other end 32 may be an unsupported cantilevered end of the tire building drum 10 with the main shaft 30 supported in a bearing 38. In other Figures the tire building drum 10 may be seen from an opposite perspective or sides relative to FIG. 1. In FIG. 2, the right hand side is actually the end 31, showing the shaft 30 with a threaded screw 33L with left hand pitches. The left hand side of FIG. 2 may be the end 32 showing the shaft 30 with threaded screws 33R with right hand pitches.

Figure 18:
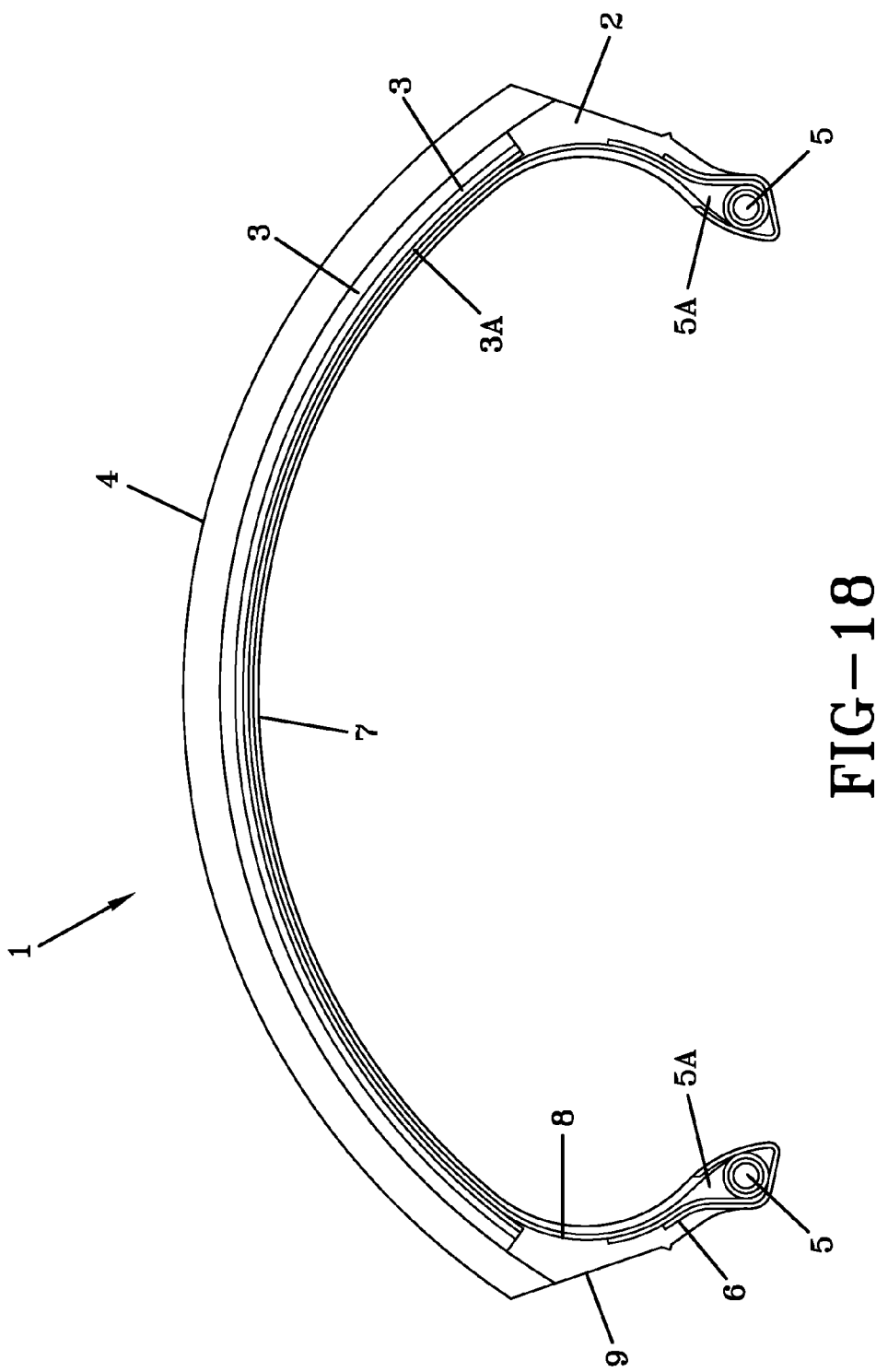
FIG. 18 is a cross-sectional view of an exemplary motorcycle tire for use with the present invention.

As a result, when the shaft 30 rotates in one direction, the two bead locks 20 may either move simultaneously and equally towards each other, or away from each other, as a function of the rotation of the shaft 30. Both bead locks 20 thereby move together, equally and simultaneously. The bead locks 20 may be pinned to a threaded nut 37 on the each end 31, 32 of the main shaft 30. Inserted through a hole(s) 35 of a bead lock housing 34, a flanged pin 60 may be threaded into the threaded nut 37 and screwed with fasteners 61 into the hole(s) 35. These pins 60 may be attached to the threaded nut 37 and may move linearly and axially as the main center shaft 30 rotates. In order for the bead locks 20 to move axially, a slot 14 may be provided in the shaft housing 12. This slot 14 may have a full width of at least 120 mm on each side of the shaft housing 12. As a result, in the fully retracted starting position, initially the bead locks 20 may be spaced approximately 350 or 360 mm apart and may move inwardly towards each other by approximately 120 mm per side, or a total of 240 mm in a fully closed position. The entire housing shaft 12, along with the bead locks 20 and center deck assembly 40, may be rotatable with this rotation enabling application of the belt reinforcing structure 3 and tread 4 to the carcass 2 of an exemplary tire 1, as shown in FIG. 18.

Figure 3:
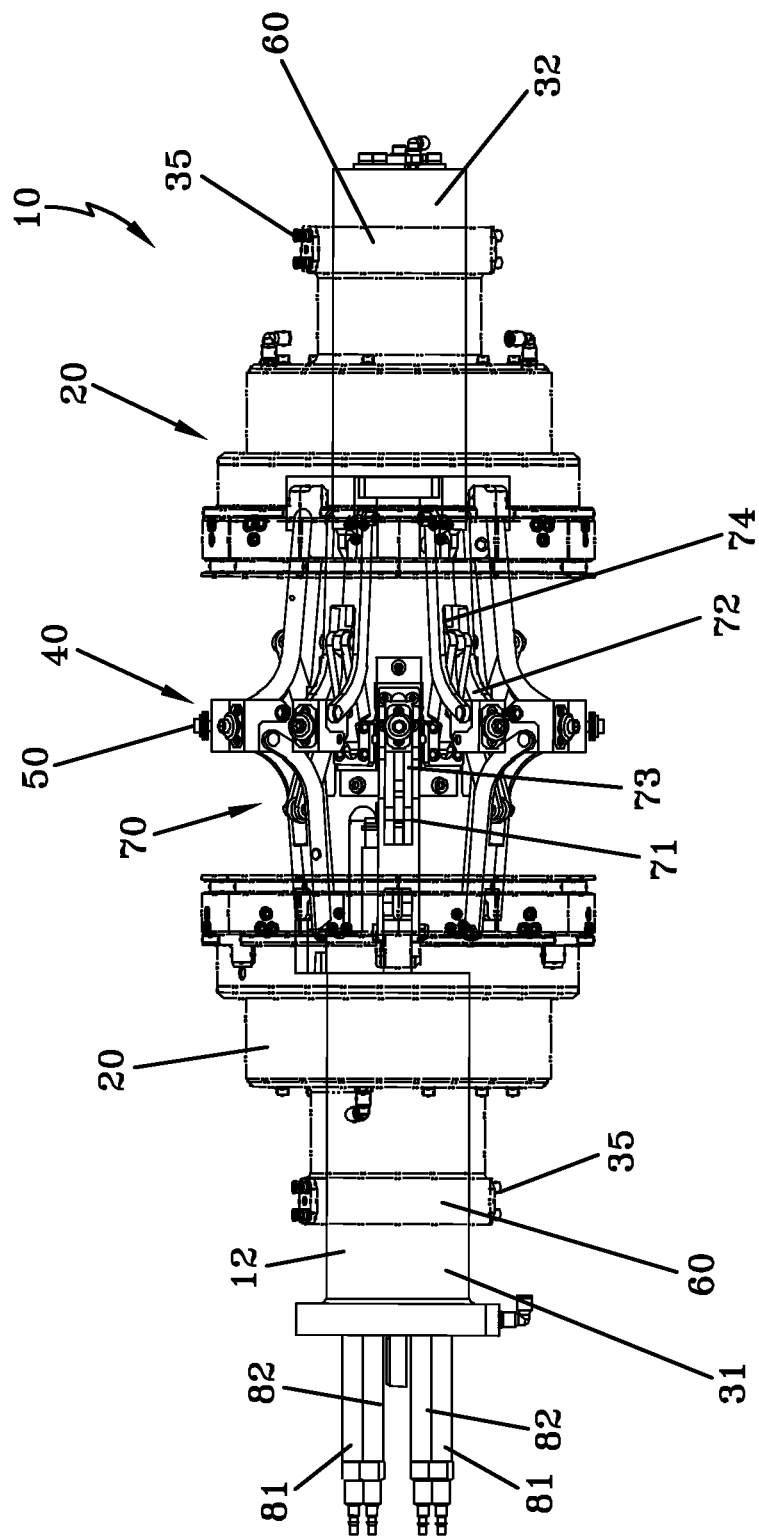
FIG. 3 is a top view of the tire building drum of FIG. 1, showing bead locks in phantom dashed lines over the axle housing and the center deck mechanism retracted.
Figure 4:
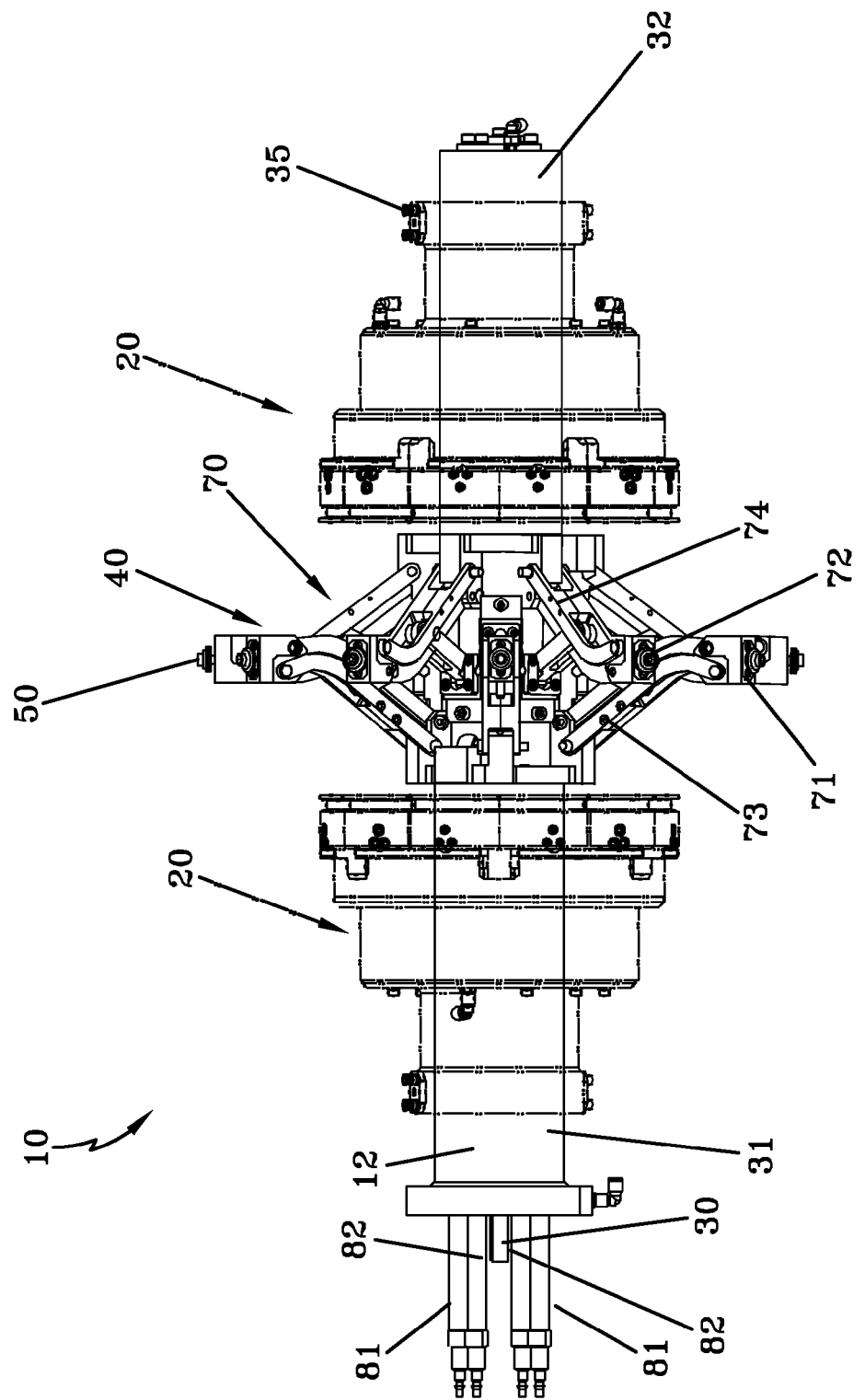
FIG. 4 is a top view of the tire building drum of FIG. 1 with the radially expanded center deck mechanism with the deck plates removed for clarity.
Figure 5:
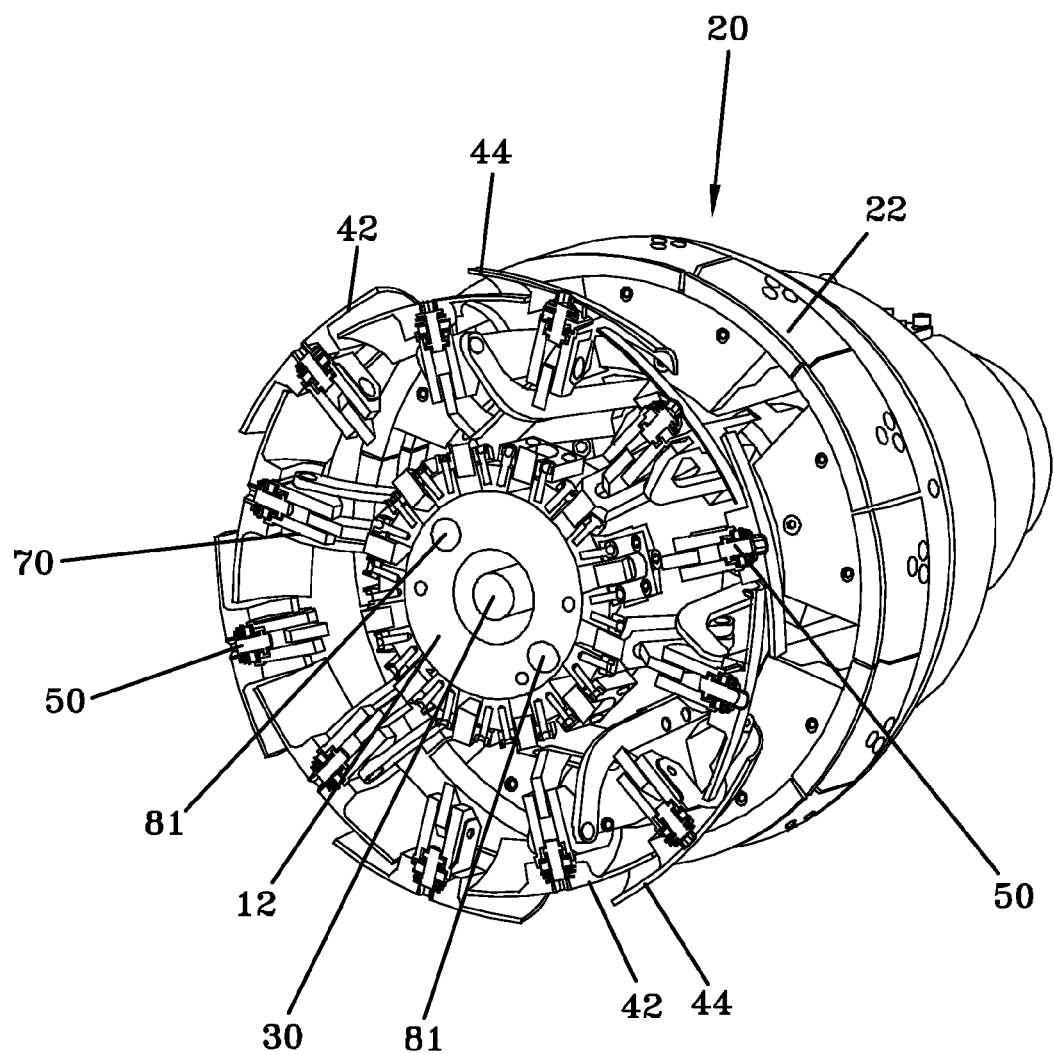
FIG. 5 is a cross sectional perspective end view of the tire building drum of FIG. 1 showing half of the center deck mechanism with the deck plates retracted.

With reference to FIG. 3, the bead locks 20 are shown in phantom lines so that the underlying components of the center deck linkage mechanism 70 may be more easily viewed. The center deck assembly 40, in a fully retracted starting position, may draw all the linkages 71, 72, 73, 74 close to the axial housing 12 as the center deck assembly moves into this fully retracted starting position. With reference to FIG. 4, in a fully expanded position, all the linkages 71, 72, 73, 74 of the linkage mechanism 70 of the center deck assembly 40 may be radially expanded. The linkages 71, 72, 73, 74 may move away from the shaft housing 12 to a more vertical orientation as the center deck assembly 40 moves radially outward relative to the shaft housing. In FIG. 5, the center main shaft 30 and the diametrically opposed drive shafts 81, 82 are shown on one side of the linkage mechanism 70. The linkages 71, 72, 73, 74 are shown in a fully retracted position. Only half of each of the deck plate assemblies 42, 44 are illustrated to show the underlying attachment and linkage mechanism 70. The deck plate assemblies 42, 44 may be formed in two sets 42, 44. The first set 42 may be radially inward of the second set 44. Sequentially, there may be 12 segments and 6 deck plates in each first set 42 and second set 44. The even numbered deck plates may form the first set 42 and the odd numbered deck plates may form the second set 44 with the first set radially inward of the second set 44.

The deck plates 42, 44 may be arcuate segments with cross sectional profiles that closely approximate the inside of a finished tire carcass 2. Only half of the sets 42 or 44 may be shown with the other half being cut away for viewing attachment of the deck plate to the linkage at the fasteners 50 and the internal structure of the linkage mechanism 70.

Figure 6:
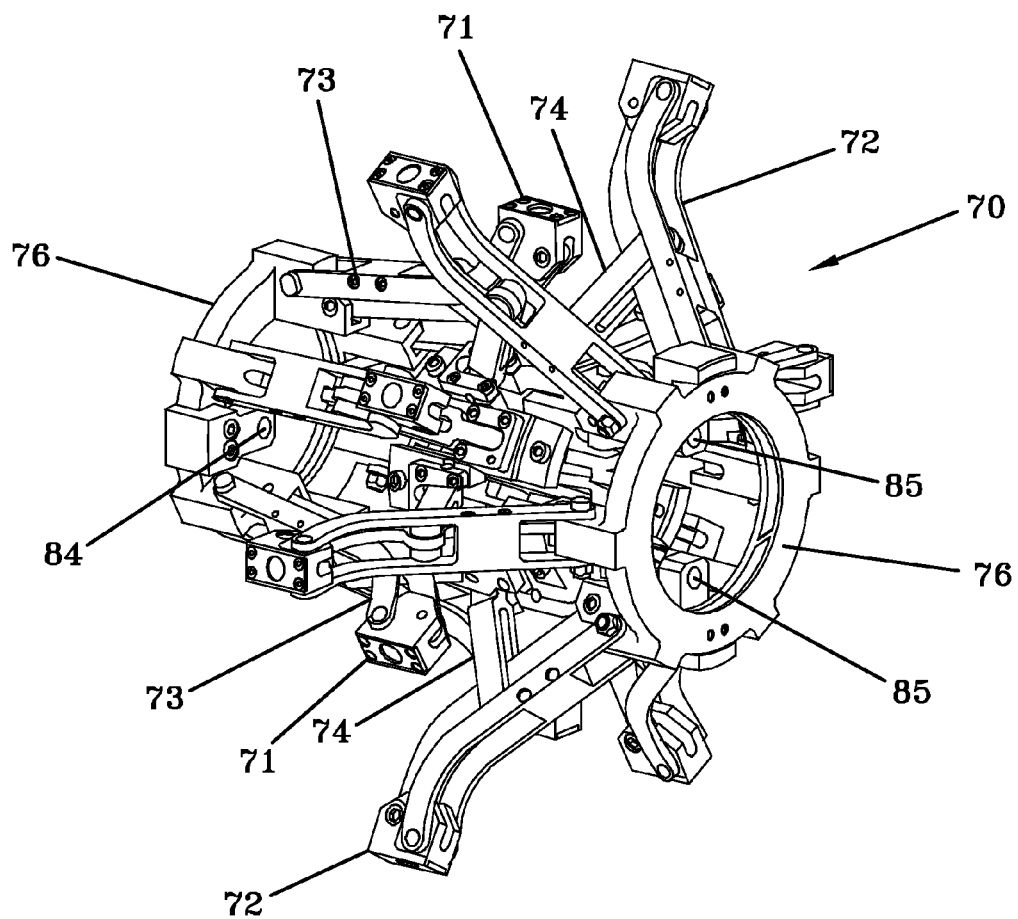
FIG. 6 is a perspective view of the tire building drum center mechanism showing the connecting linkage mechanisms with the deck plates removed for clarity.

As shown in FIGS. 5 and 6, the linkage mechanism 70 may drive the center deck assembly 40, in and out. The linkages 72, 74 of the center deck assembly 40 may be pivotally connected to the second set 44 of linkages 71, 73 radially outward of the first set of linkages 71, 73 that move the first set of deck plates 42. The linkages 71, 73 similarly may be pivotally connected. The deck plates 42 may be removed, along with the housing 12 and bead locks 20, thereby enabling access to the linkage mechanism 70. The entire linkage mechanism 70 may be connected at the end rings 76. The end rings 76 may be connected to, and driven by, two sets of shafts 81, 82. By positioning the shafts 81, 82 diametrically opposite each other (e.g., 180° relative to the axis of rotation or the main center shaft 30), the load may be balanced such that the first set or second set of deck plates 42, 44 may move radially outward with an equal load on the two pairs of shafts. The first set of drive shafts 81 may move the first set of deck plates 42 and be connected at an opening 84 of the end ring 76. The second set of drive shafts 82 may move the second outer set of deck plates 42 before the radially inner deck plates 42 may be moved. The linkages 71, 73 may be expanded outwardly by rotation of the second set of drive shafts 82 connected to the opposing end ring 76 at an opening 85. The openings 84 (only one visible in FIG. 6) may be aligned 180° apart (e.g., diametrically opposed) and axially centered, as may be the openings 85, with the openings 84 being oriented 90° to the openings 85.

By having these pairs of shafts 81, 82 diametrically opposed and oppositely positioned relative to each other, the linkage mechanism 70 may be compactly driven. Further, the first set 81 and second set 82 of the drive shafts may also balance the load. Each of these sets 81, 82 may be driven by independent linear motors 91, 92 housed in the motor housing 90 (FIG. 17). Accordingly, when a tire carcass 2 is positioned on the building drum 10, the bead locks 20 first may be moved into a position by rotation of the main shaft 30 and radially expanded to secure the bead locks and second the center mechanism 40 of the drum 10, with the carcass 2, may be expanded with the tire building drum 10 rotated to apply the belt structure and/or the belts.

Figure 7:
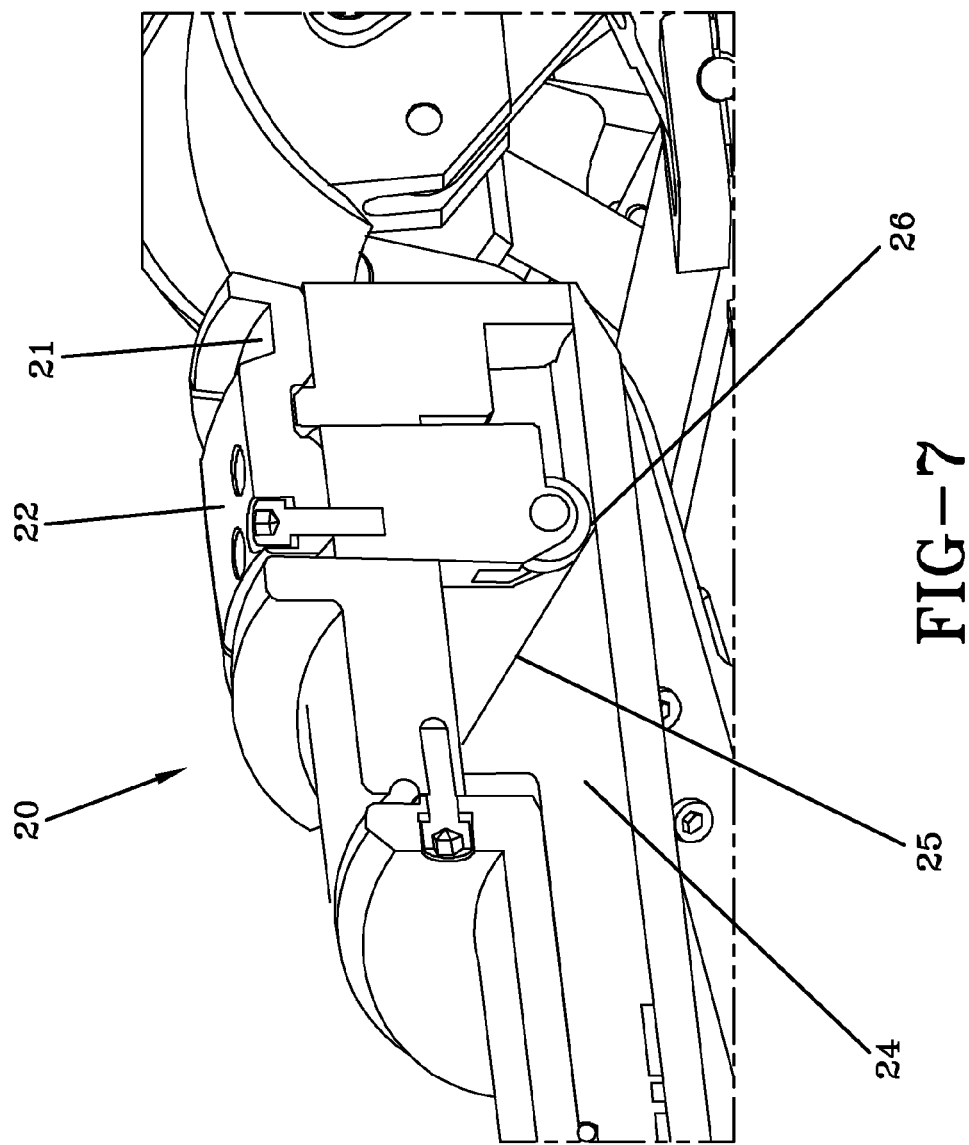
FIG. 7 is a cross sectional view of a portion of the bead lock of the tire building drum of FIG. 1 showing the ramped guide withdrawn and the bead lock retracted.
Figure 8:
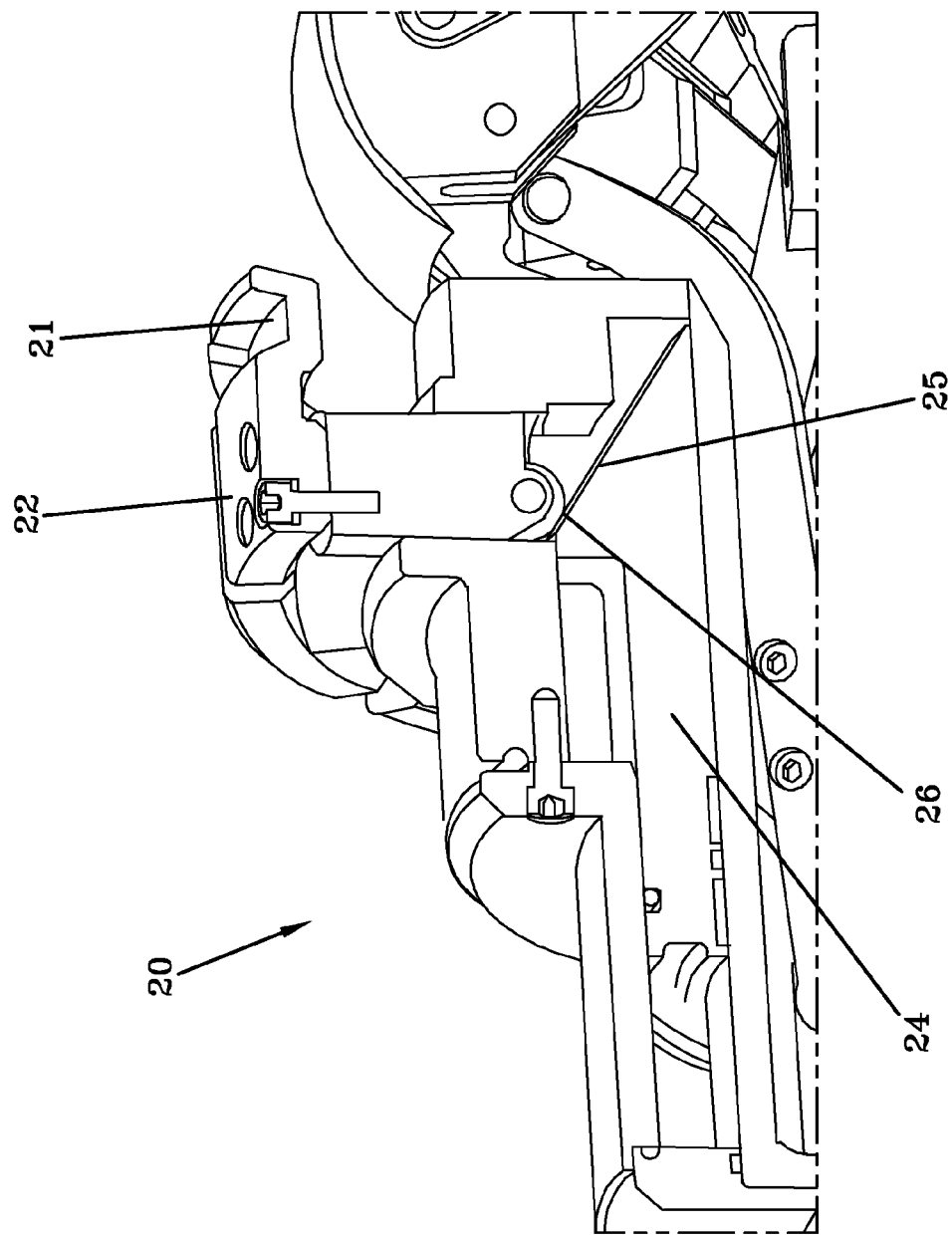
FIG. 8 is the cross sectional view of FIG. 7 of the tire building drum showing the bead lock ring in the radially expanded condition and the ramped guide lifting the roller on the bead lock ring.

With reference to FIGS. 7 and 8, a portion of the bead locks 20 may be in a retracted position (FIG. 7). A ramped surface 25 may be pulled back from a wheel 26 attached to the segments 22 of the bead locks 20. The ramped surface 25 may be part of the moveable ring shaped element 24 (FIG. 8). The bead lock 20 may move to a fully expanded condition when the ramped surface 25 moves inward toward the center deck assembly 40. Air pressure may act on the ring element 24 to move the ramped surface 25. The air pressure may be supplied to the bead locks 20 on each side of the ring element 24 and, upon activation a valve (not shown), may cause the ring element 24, along with the ramped surface 25, to move toward the center deck assembly 40 thereby pushing upward the wheels 26 attached to each segment 22 of the bead locks 20. The amount of pressure may provide a minimum sufficient amount of force to hold the beads of the tire carcass 2 in place during tire building assembly.

In FIGS. 7 and 8, the arcuate segments 22 are shown exposed, but in normal manufacturing conditions, a thin layer of rubber in a band or stretchable ring like shape may be applied over the arcuate segments 22 such that an uncured soft rubber band lying over the bead locks 20 may not be damaged as the arcuate segments expand into a fully opened position. In FIG. 17, this soft rubber band underlies the beads of the carcass 2 and may be between 2.0 mm to 4.0 mm thick.

Figure 9:
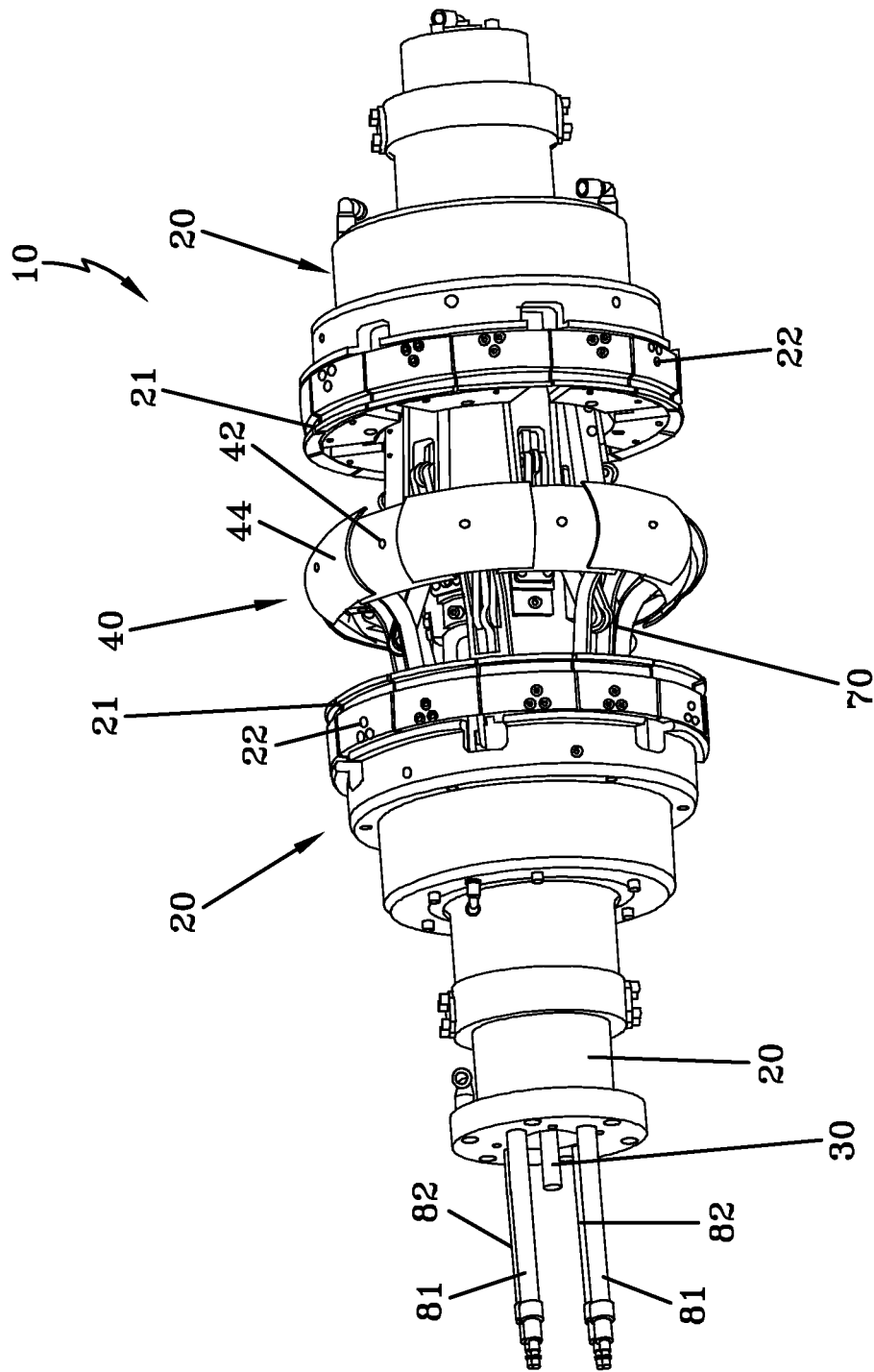
FIG. 9 is a perspective view of the tire building drum of FIG. 1 showing the deck plate retracted in the start position with bead locks retracted.
Figure 10:
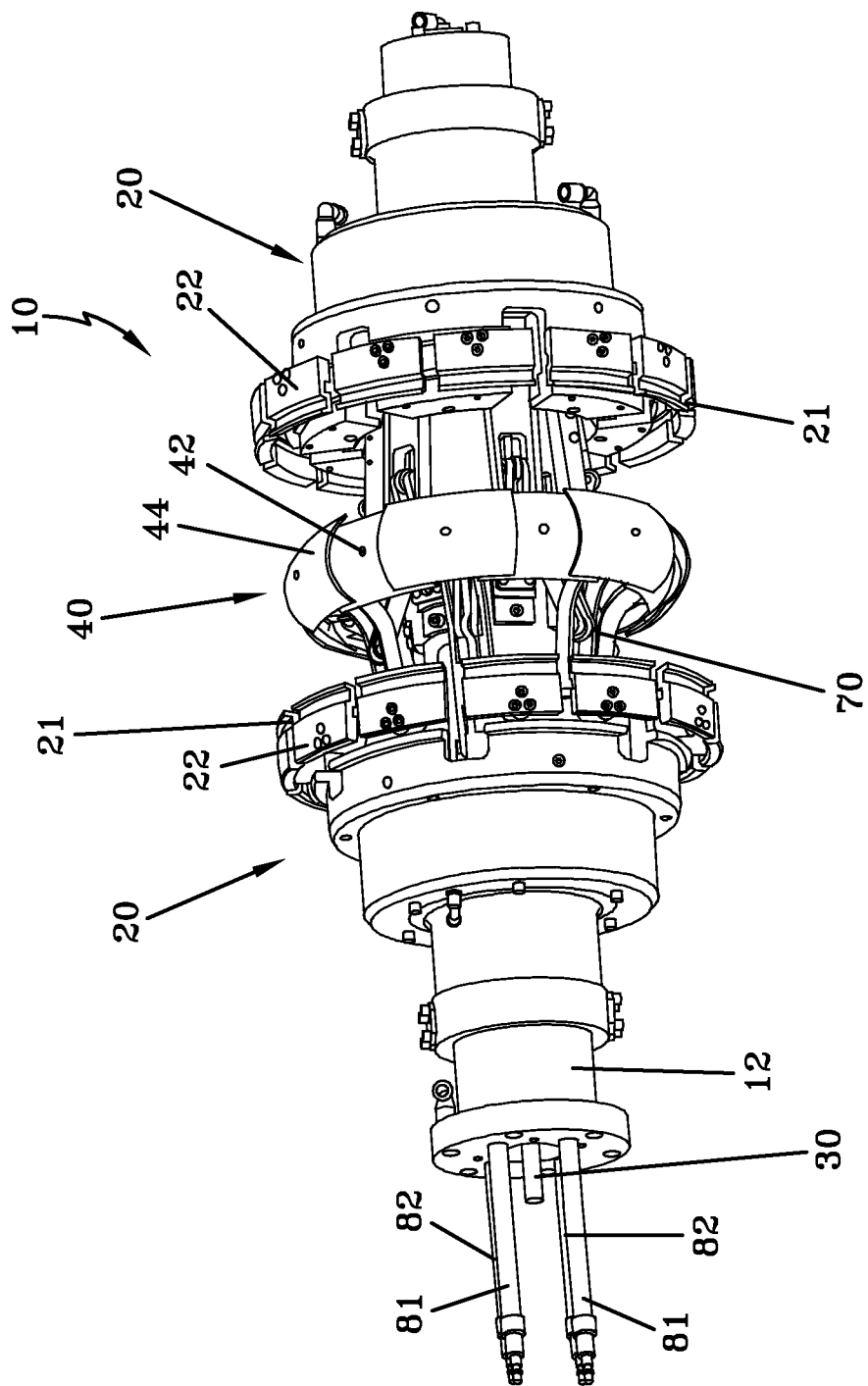
FIG. 10 is a perspective view of the tire building drum of FIG. 1 showing the bead locks expanded with the deck plates retracted.

With reference to FIGS. 9 through 15, a tire building sequence is illustrated with respect to the orientation of the tire building drum 10. In FIG. 9, the deck plates 42, 44 may be fully retracted such that the first set of deck plates 42 lie radially inward of the second set of deck plates 44. The bead locks 20 may move axially outward relative to the center deck assembly 40 to a fully retracted, open (or start) position. The bead locks 20 may thus receive a tire carcass 2 (not shown in FIG. 9). The arcuate segments 22 may fully abut each other in this fully retracted orientation. The bead locks 20 may then expand radially outward to hold the beads of the carcass 2 in the grooves 21. In FIG. 10, the arcuate segments 22 may start to move radially outward creating a gap between the underlying adjacent arcuate segments 22.

Figure 11:
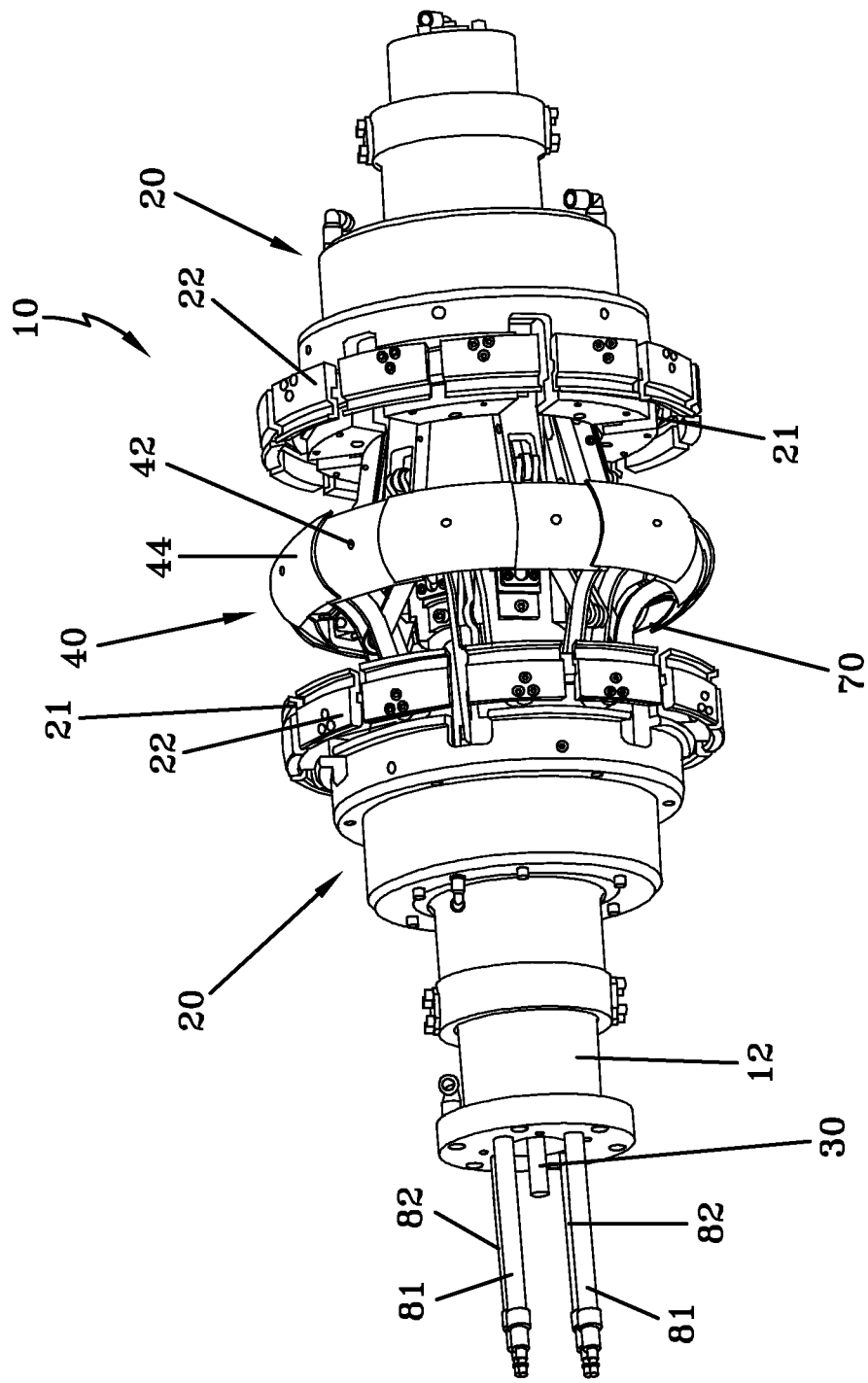
FIG. 11 is a perspective view of the tire building drum of FIG. 1 showing the center deck plate in a shaping position starting to expand.
Figure 12:
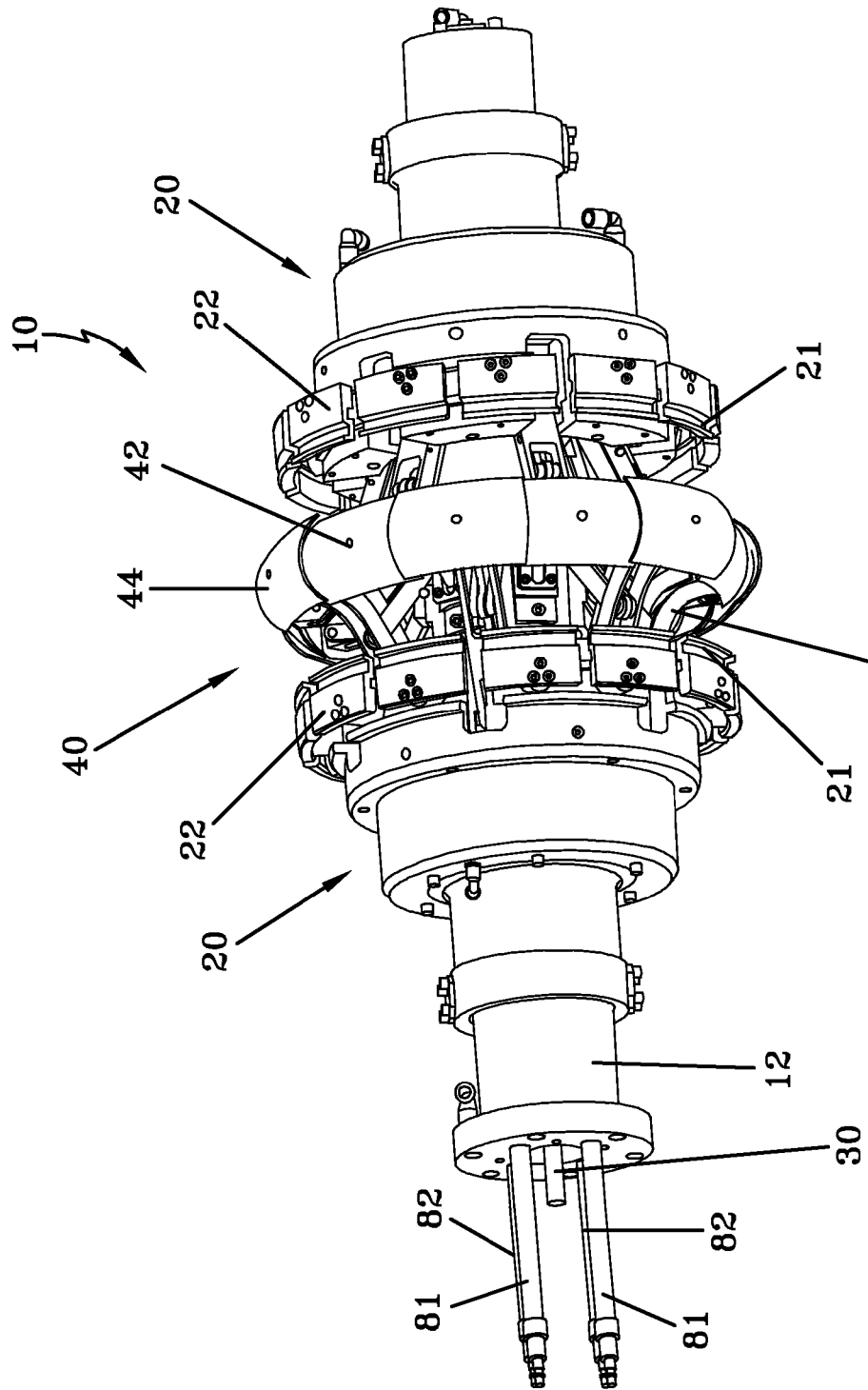
FIG. 12 is a perspective view showing the bead locks moving toward the expanding center deck of the tire building drum of FIG. 1.
Figure 13:
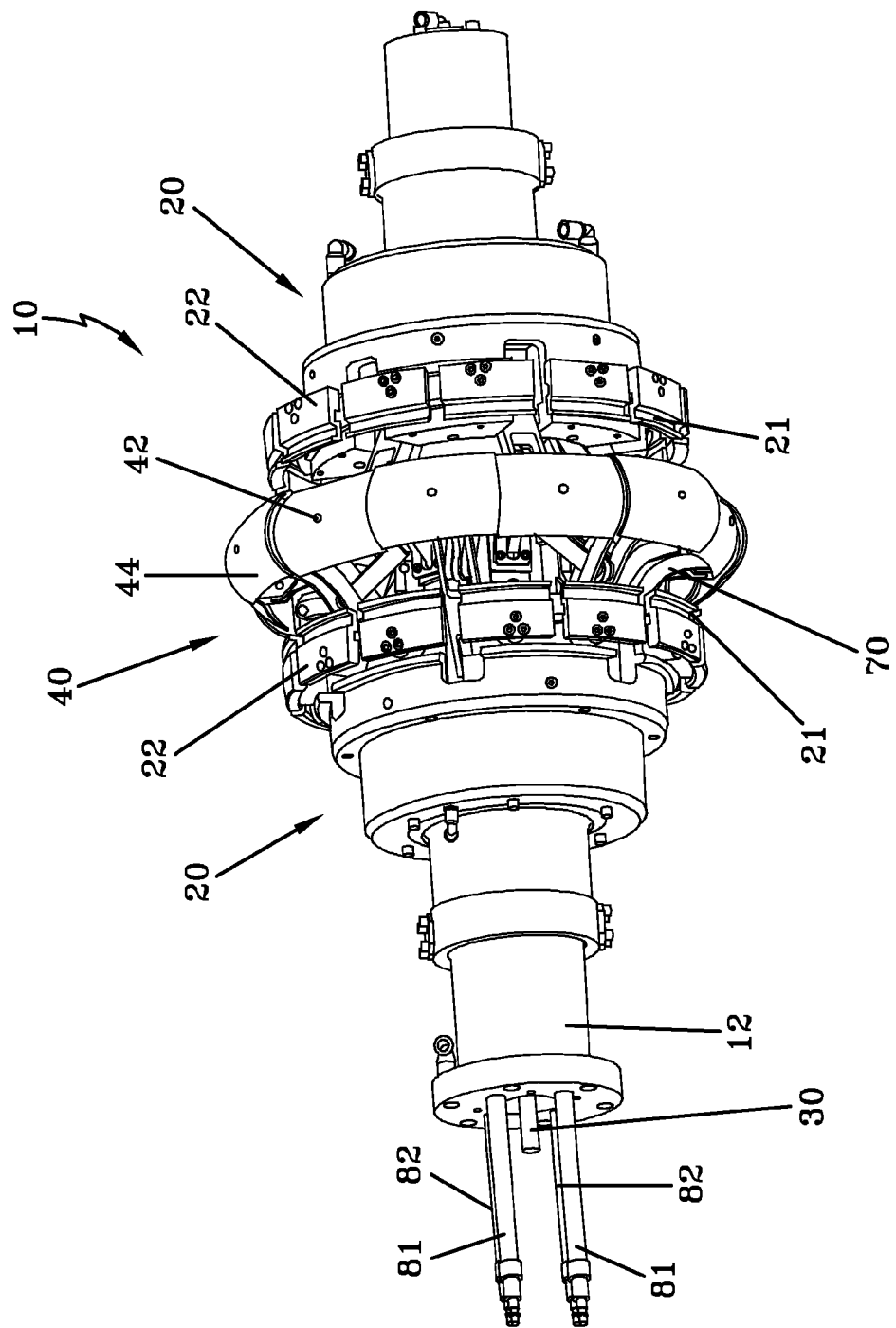
FIG. 13 is a perspective view of the tire building drum of FIG. 1 showing the bead locks moved to the correct bead width as the center deck plates continue to radially expand.

As noted above, an elastic rubber band may be placed over the arcuate segments 22 such that, as the carcass 2 is being held by the bead locks 20, the underlying segments may engage the soft, uncured rubber band. In FIG. 11, as the bead locks 20 move axially inward towards the center deck assembly 40, the center deck assembly may expand radially outward. The radially outer set of deck plates 44 may initially move as the underlying set of deck plates 42 follows. The radially inner set of deck plates 42 may not move faster than, or before, the outer set of deck plates 44 thereby avoiding jamming of the deck plates 42, 44. In FIG. 12, this expansion may continue wherein the carcass 2, due to the radial expansion of the center deck assembly 40, may be tensioned slightly by the underlying deck plates 42 as the carcass approaches the fully expanded position.

Figure 14:
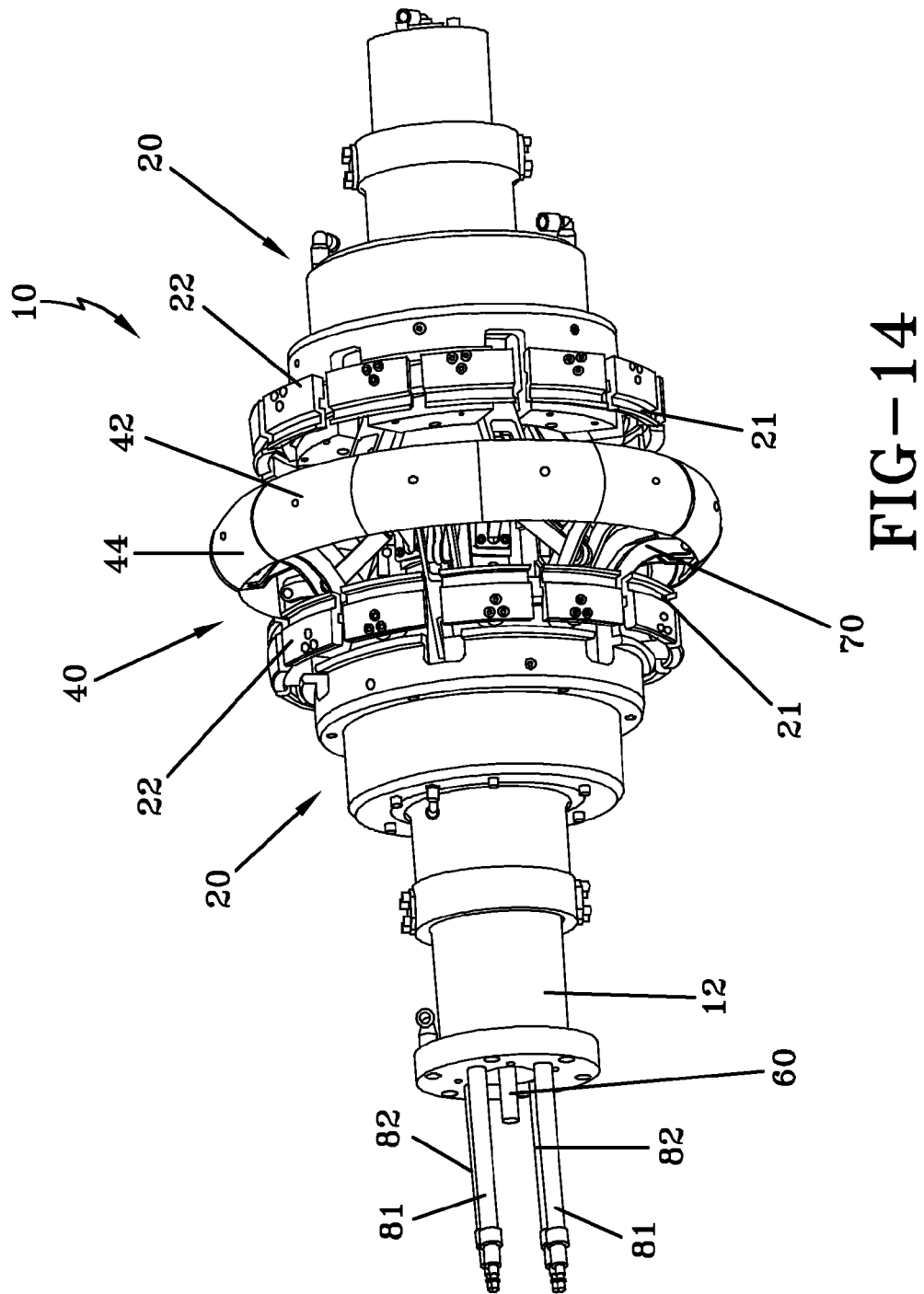
FIG. 14 is a perspective view of the center deck plate abutted to form a solid deck for final assembly and application of the belt structure and tread layer to form the finished tire.

When the bead locks 20 move to a proper bead width for the pneumatic tire 1, the radially expanded deck plates 42, 44 (FIG. 13) may almost be fully expanded. In FIG. 14, the underlying deck plates 42 are shown in a fully expanded position with the circumferentially adjacent deck plates 44 shown in an abutting relationship. The tire carcass 2 may now have the belt reinforcing structure 3 and tread 4 applied thereto. In FIG. 15, the bead locks 20 move radially inward to a predetermined of the bead width of the pneumatic tire 1 and the center deck assembly 40 is fully expanded.

An entire machine assembly 100, with the tire building drum 10, may be cantilevered from the machine housing 90 such that the tire building drum assembly is cantilevered from one end of the machine housing 90 (FIG. 16). As shown in FIGS. 16 and 17, an unvulcanized and uncured tire carcass 2 may be mounted on the fully expanded center deck assembly 40. The machine housing 90 may have two linear motors 91, 92, one for driving the first set of drive shafts 81, the other for driving the second set of drive shafts 82, respectively. In addition to the two linear motors 91, 92, a central drive motor 94 may operate the shaft housing 12 and another electric motor 93 may drive the central main shaft 30. Accordingly, the main shaft 30 may be driven by an electric motor 93, which moves the bead locks 20 axially inward or outward, depending on the direction of rotation of the main shaft 30 and the two linear motors 91, 92 may drive the sets of drive shafts 81, 82 that are positioned in pairs in the axial housing 12, as previously discussed axially, in or out, to raise or lower the linkage mechanism 70.

The linear motors 91, 92, when moving the drive shafts 81, 82, may enable the sets of deck plates 42, 44 to move independently of the other set. In combination, all three motors 91, 92, 93 may be independently programmable such that the movement of the bead locks 20 in association with the center deck plates 42, 44 on the deck assembly 40 may be achieved in a programmable sequential fashion for shaping and conforming the tire carcass 2 to the proper shape of approximating the finished tire 1. At this point, the tire belt reinforcing structure 3 and tread 4 may be applied on a 360° solid deck surface.

In FIG. 18, an exemplary tire carcass 2 of an exemplary pneumatic tire 1 may have the underlying carcass 2 with the pair of beads 5 and apexes 5A, radial ply turnups 6, and an air impervious innerliner 7 radially inward of the tire ply 8. Sidewall rubber 9 may be applied with other strips of rubber to form the basic tire carcass 2. Once the tire carcass 2 is assembled in a first stage in a cylindrical shape on a separate machine, the tire carcass may be conformed to the arcuate, toroidal shape in a second stage at the tire building drum 10. Once the tire carcass 2 is positioned on the tire building drum 10 and the bead locks 20 are positioned properly in the fully expanded position, the tire carcass 2 may be conformed to a shape very close to a finished tire structure, as the bead locks 20 move axially together setting the proper bead width as the solid deck assembly 40 is fully expanded.

A spiral or zigzag overlay 3A may be attached to the tire carcass 2 (FIG. 18). Also, two belt reinforcing layers 3 may be applied to the tire carcass 2. Then, the tread 4 may be overlayed to make the finished uncured, or "green", tire 1. When building a tire with an overlay 3A, be it spirally wound at close to 0° relative to a circumferential center plane of the pneumatic tire 1 or in a zigzag pattern across the pneumatic tire, the building surface should desirably be exact with no deviations. The center deck assembly 40 may build different sized tires as the deck plates 42, 44 of one size may be quickly exchanged with new sets of deck plates for different sized tires.

As described above, the pneumatic tire 1 may be a motorcycle tire specifically designed with nominal bead diameters of 16.0 inches, 16.5 inches, or 17.0 inches. A variety of motorcycle tires may thus be provided of varying sizes, aspect ratios, and bead widths depending on a desired tire construction. When the tire building drum 10 is programmed to build a particular tire, the drum may set the proper bead width and the bead locks 20 may be positioned at bead diameters ranging from 16-17 inches. Once a finished tire 1 is assembled, the bead locks 20 may be retracted, as well as the center deck assembly 40, thereby enabling removal of the finished tire from the tire building drum 10. Once removed, the bead locks 20 and center drum assembly 40 may return to the fully open starting position (FIG. 1).

Conventionally, a significant amount of effort and time has been required to unseat the beads 6 of a finished tire 1 from the tire building drum 10. A stitcher wheel has been placed against the rotating tire/drum assembly 1, 10 for several seconds to apply enough force to break the tire 1 away from the drum surface. Alternatively, a tire builder has been required to pry the tire 1 free of the drum 10 by forcing his/her fingers between the tire bead 6 and drum, while rotating the drum.

A mechanism 200 in accordance with the present invention may facilitate release of the tire 1 from the drum 10 thereby allowing the drum to collapse away from the tire and removal of the tire. Without this mechanism 200, shear forces between the expanded drum 10 and the tire 1 have resisted shrinking of the drum circumference thereby inhibiting the diameter change necessary to separate the tire from the drum.

Figure 19:
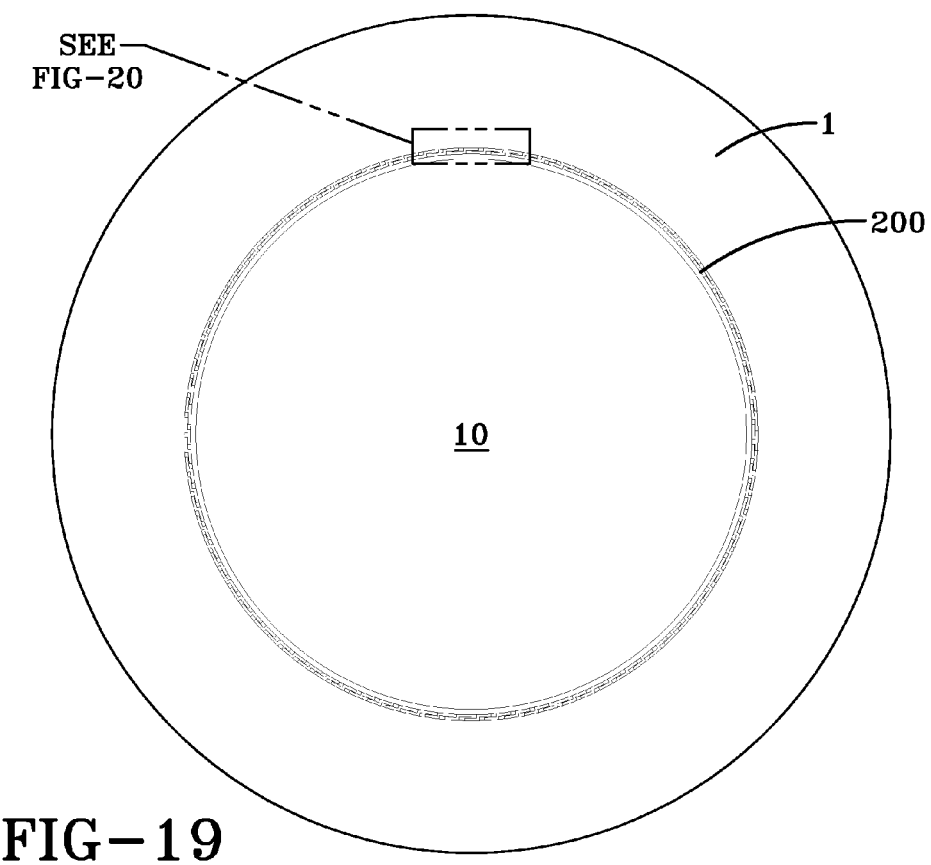
FIG. 19 is a schematic cross sectional view of a green tire release mechanism in accordance with the present invention.
Figure 20:
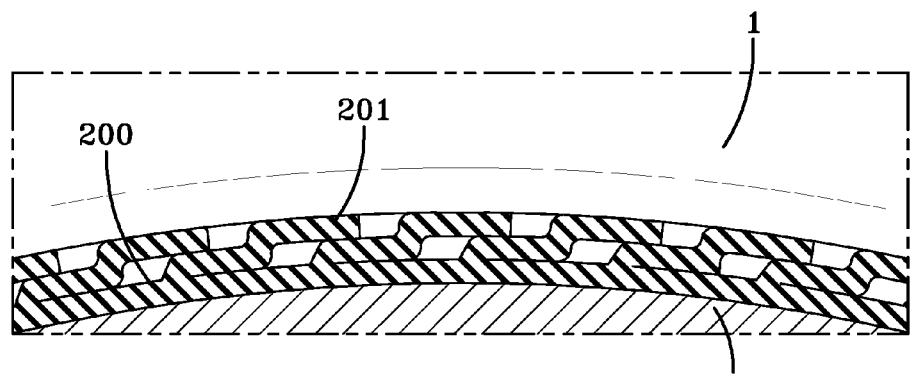
FIG. 20 is a schematic detail view of the release mechanism of FIG. 19.
Figure 21:
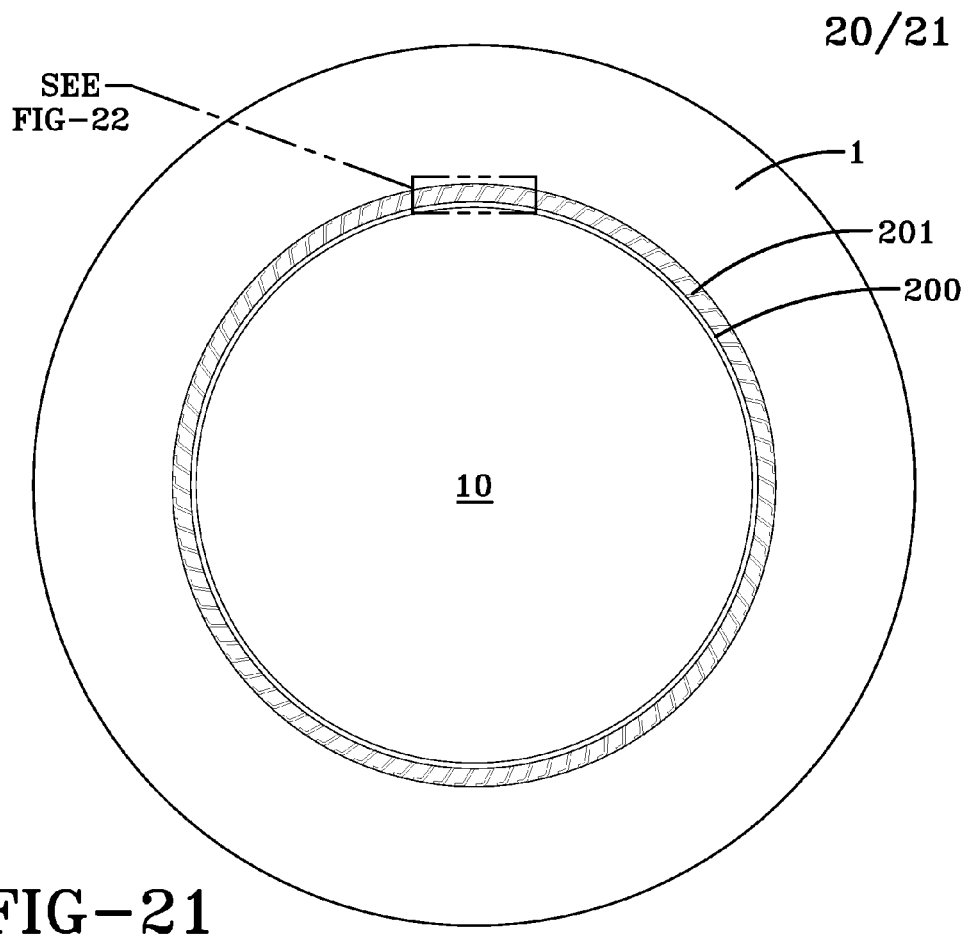
FIG. 21 is a schematic cross sectional view of the release mechanism of FIG. 19 under a different condition.
Figure 22:
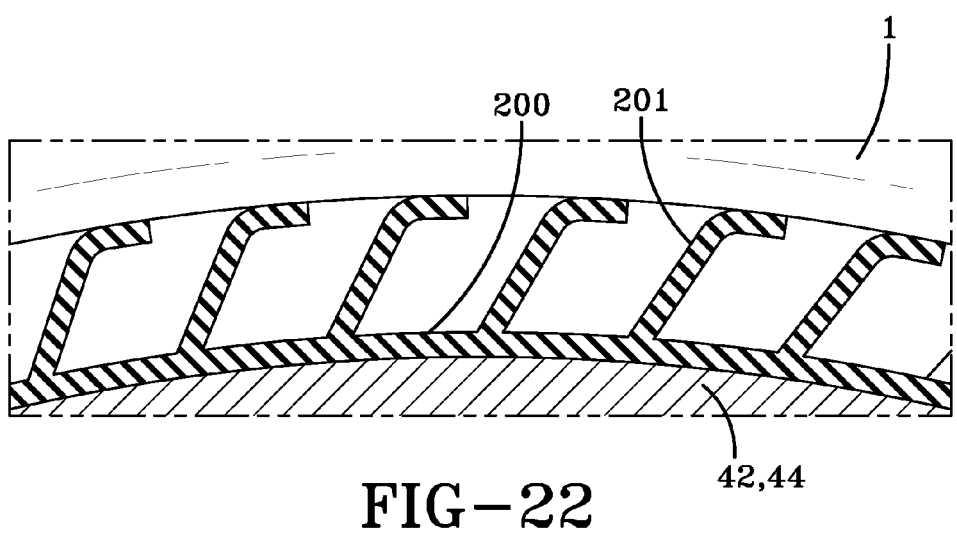
FIG. 22 is a schematic detail view of the release mechanism of FIG. 21.
Figure 23:
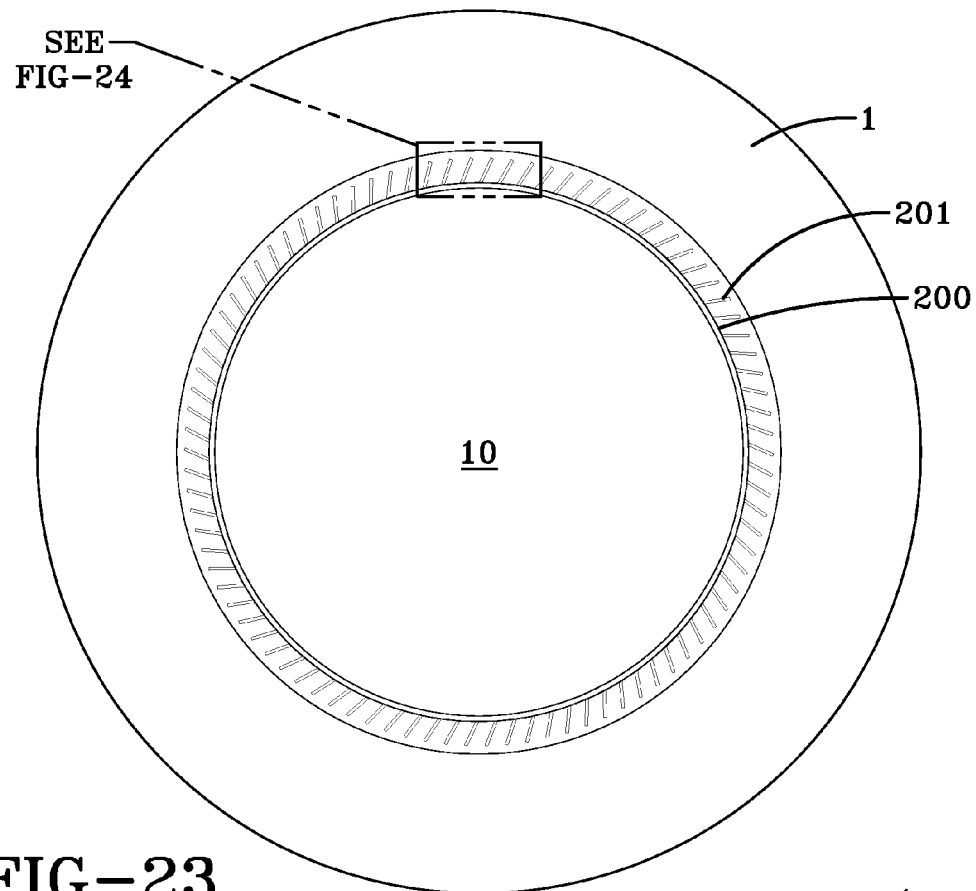
FIG. 23 is a schematic cross sectional view of the release mechanism of FIG. 19 under a still different condition.
Figure 24:
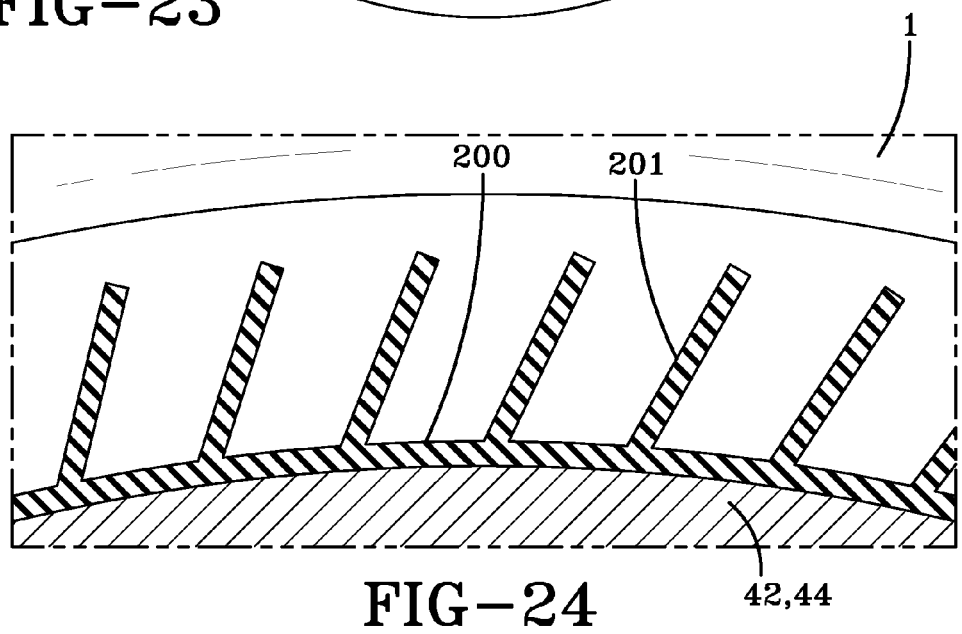
FIG. 24 is a schematic detail view of the release mechanism of FIG. 23.

The mechanism 200 advantageously provides faster more reliable removal of tire 1, mitigates/eliminates damage to the tire during removal or lubricant application, injuries to a tire builder during removal, and/or damage to the drum 10 and/or stitcher during removal. As shown in FIGS. 19 through 24, the release mechanism 200 may be a continuous hoop of a suitably non-stick and elastic polymer band. Additionally, the release mechanism 200 may also define a peeling action during tire removal through a construction of a plurality of flaps 201 attached to the hoop. The peeling action thus mitigates/eliminates the high shear forces inhibiting collapse of the tire building drum 10 and removal of the finished green tire 1. As shown in FIGS. 19 and 20, the release mechanism 200 may be placed around the tire building drum 10 between the tire carcass 2 and the tire building drum prior to the tire building process, as described above. Following the tire building process, as shown in FIGS. 21 and 22, the tire building drum 10 may begin radial collapse with the flaps 201 partially disengaging from green tire 1. This partial disengagement reduces the initial forces holding the tire building drum 10 and the green tire 1 together. In FIG. 22, the flaps 201 may extend both radially and circumferentially to define a vaned, or webbed, circle in cross section. As the tire building drum 10 collapses further, as shown in FIGS. 23 and 24, the flaps 201 may fully disengage from the green tire 1 allowing easy removal of the green tire from the tire building drum. Each flap 201 may be attached at one circumferential end to the hoop with the other circumferential end left unattached (FIG. 22). During the tire building process, the release mechanism may form the cylindrical band of FIG. 20 with the flaps 201 overlapping each other. The outer diameter of the tire building drum 10 should be appropriately reduced by the radial thickness of the overlapping structure 200 to compensate for the proper bead diameter of the desired green tire 1.

While the present invention has been illustrated by a description of various examples, and while these examples have been described in considerable detail, it is not the intention of the applicant to restrict, or in any way limit, the scope of the appended claims to such detail. Additional advantages and modifications will readily appear to those skilled in the art from the above description. Thus, the present invention, in its broader aspects, is therefore not limited to the specific details and illustrative examples as described. Accordingly, departures may be made from such details without departing from the spirit or scope of applicant's general inventive concept.

What is claimed:

1. A system comprising:
a rotatable tire building drum, and a release mechanism; wherein the rotatable tire building drum comprises:
    a pair of axially and radially moveable bead locks, and
    a radially expandable and retractable building deck assembly positioned axially between the bead locks, the building deck assembly having a first set of deck plates and a second set of deck plates, the deck plates sized to abut at a fully expanded position of the deck plates to form a solid 360° building surface in which the first deck plates alternate with the second deck plates, wherein the rotatable drum is configured to be capable of achieving a retracted position after a radially inward motion of the deck plates in which the first deck plates move more radially inward than the second deck plates such that in the retracted position, the first deck plates will become underlying to the second deck plates;
wherein the release mechanism comprises:
    a continuous hoop of a non-stick and elastic polymer, a radially exterior surface of the hoop further including a plurality of flaps each attached to the hoop at one end and unattached to the hoop at an opposite end, the flaps extending both radially and circumferentially towards their unattached ends so as to overlap one another along the radially exterior surface;
wherein the release mechanism is provided around the deck plates in their expanded state so that the release mechanism is positionable between the solid building surface and a tire carcass supported on the solid building surface and will remain in contact with the deck plates if they begin their radially inward motion such that the release mechanism is capable of the intended use of:
    having its flaps peel away from an air impermeable inner layer of the carcass while maintaining contact between the hoop and the deck plates while the deck plates undergo the radially inward motion such that the release mechanism obtains the shape of a vaned circle as its flaps peel away from the air impervious inner layer of the carcass, thereby causing the carcass to experience less shear force than would occur if the deck plates were in contact with the carcass at the time of the radially inward motion.

2. The system of claim 1, wherein the deck plates have the form of arcuate segments.

3. The system of claim 2, wherein the tire building drum comprises a pneumatic pressurized air supply.

4. The system of claim 2, wherein the bead locks are expandable to accommodate motorcycle bead diameters of 16, 16.5, and 17 inches.

* * * * *